(12) United States Patent
Ravenscroft et al.

(10) Patent No.: US 12,000,949 B2
(45) Date of Patent: Jun. 4, 2024

(54) POWER-EFFICIENT FORMULATION OF TANDEM-HOPPED RADAR AND COMMUNICATIONS

(71) Applicants: University of Kansas, Lawrence, KS (US); THE UNITED STATES OF AMERICA AS REPRESENTED BY THE SECRETARY OF THE AIR FORCE, Washington, DC (US)

(72) Inventors: Gerald Brandon Ravenscroft, Overland Park, KS (US); Patrick M. McCormick, Berryton, KS (US); Shannon D. Blunt, Shawnee, KS (US); Erik S. Perrins, Lawrence, KS (US); Justin G. Metcalf, Dayton, OH (US)

(73) Assignees: University of Kansas, Lawrence, KS (US); The United States of America as Represented by the Secretary of the Air Force, Washington, DC (US)

( * ) Notice: Subject to any disclaimer, the term of this patent is extended or adjusted under 35 U.S.C. 154(b) by 484 days.

(21) Appl. No.: 17/269,077

(22) PCT Filed: Sep. 21, 2019

(86) PCT No.: PCT/IB2019/058001
§ 371 (c)(1),
(2) Date: Feb. 17, 2021

(87) PCT Pub. No.: WO2020/065483
PCT Pub. Date: Apr. 2, 2020

(65) Prior Publication Data
US 2021/0208237 A1    Jul. 8, 2021

Related U.S. Application Data

(60) Provisional application No. 62/737,074, filed on Sep. 26, 2018.

(51) Int. Cl.
G01S 7/00      (2006.01)
G01S 13/34     (2006.01)
H04L 27/26     (2006.01)

(52) U.S. Cl.
CPC ............ G01S 7/006 (2013.01); G01S 13/347 (2013.01); H04L 27/2626 (2013.01)

(58) Field of Classification Search
CPC ..... G01S 7/006; G01S 13/347; H04L 27/2626
See application file for complete search history.

(56) References Cited

U.S. PATENT DOCUMENTS

2011/0193739 A1 * 8/2011 Strauch ............... H04L 27/2647
                                                              342/146
2016/0334501 A1   11/2016 Ling

OTHER PUBLICATIONS

Brandon Ravenscroft, A Power-Efficient Formulation of Tandem-Hopped Radar & Communications, IEEE, 1061-1066 (Year: 2018).*

(Continued)

*Primary Examiner* — Marc Anthony Armand
(74) *Attorney, Agent, or Firm* — Norton Rose Fulbright US LLP

(57) ABSTRACT

Systems, methods, and computer-readable storage media for generating, transmitting, and utilizing a composite radar and communication waveform are disclosed. The composite radar and communication waveform may facilitate radar detection and data communication operations and may be generated from a frequency modulated (FM) radar waveform and a communication signal. In an aspect, the composite radar and communication waveform may be generated by iteratively executing a shaping process against the FM radar waveform and the communication signal until a first stop criterion is satisfied to produce an initial composite radar and communication waveform having the communication signal embedded therein, and then iteratively executing an enhancement process against the initial composite (Continued)

radar waveform and the communication signal until a second stop criterion is satisfied to produce a final composite radar and communication waveform suitable for both radar detection and data communication operations.

20 Claims, 16 Drawing Sheets

(56) References Cited

OTHER PUBLICATIONS

Ravenscroft, B. et al. "A Power-Efficient Formulation of Tandem-Hopped Radar & Communications," 2018 IEEE Radar Conference (RadarConf18), 2018, pp. 1061-1066, 6 pages.
Patent Cooperation Treaty, International Search Report and Written Opinion Issued for PCT Application No. PCT/IB2019/058001, dated Jun. 12, 2020, 16 pages.

* cited by examiner

US 12,000,949 B2

POWER-EFFICIENT FORMULATION OF TANDEM-HOPPED RADAR AND COMMUNICATIONS

PRIORITY

This application is a national phase application under 35 U.S.C. § 371 of International Application No. PCT/IB2019/058001 filed Sep. 21, 2019, which claims priority to U.S. Provisional Patent Application No. 62/737,074 filed Sep. 26, 2018. The entire contents of each of the above-referenced disclosures is specifically incorporated by reference herein without disclaimer.

GOVERNMENT INTEREST

This invention was made with government support under Grant No. FA8650-14-D-1722 awarded by the United States Air Force. The government has certain rights in the invention.

TECHNICAL FIELD

The present disclosure generally relates to the design and processing of joint radar and communications waveforms. More specifically, the present disclosure is related to improved techniques for embedding of orthogonal frequency division multiplexing (OFDM) communication symbols into physical radar waveforms.

BACKGROUND

Increasing spectral congestion is driving research into a wide variety of strategies for spectrum sharing between radar and communications, which can coarsely be categorized as cohabitation or co-design, the latter including multifunction systems. It has been shown that one possible multi-function arrangement is to emulate the frequency-hopping spread spectrum (FH-SS) concept by inserting weighted OFDM subcarriers into a notch formed in the radar waveform spectrum. The weighting ensures the power spectrum of the composite radar and OFDM communication signal maintains a structure that provides an acceptable delay-Doppler ambiguity function, which may also be aided by the tandem hopping of the notch/subcarriers around the radar spectrum.

This approach, denoted as tandem-hopped radar and communications (THoRaCs), relies on a notched instantiation of FM noise radar that has been demonstrated experimentally. However, the OFDM component of THoRaCs has a well-known drawback of potentially high peak-to-average power ratio (PAPR). Since radar emissions typically need to be emitted at high power, and since OFDM has been shown to have limited utility for radar applications due to the associated power amplifier effects, the practical implementation of THoRaCs therefore necessitates separate transmitters for the radar and communication signals. Accordingly, a system implementing THoRaCs will include a first transmitter for transmitting a high-power radar emission and a second transmitter for transmitting the OFDM signal.

SUMMARY

The present application discloses systems, methods, and computer-readable storage media for implementing a new approach to forming composite radar and communication waveforms. The new approach disclosed herein, denoted as power-efficient THoRaCs (PE-THoRaCs), is configured to provide undistorted communication subcarriers within a constant amplitude waveform possessing an acceptable delay-Doppler ambiguity function and suitable for high power transmission. Unlike the above-described THoRaCs approach, which requires separate transmitters in order to facilitate transmission of the radar and communication signals, the PE-THoRaCs approach disclosed herein produces a composite radar and communication waveform suitable for a single dual-purpose emission.

As described in more detail below, the PE-THoRaCs approach disclosed herein may generate the composite radar and communication waveform based on a frequency modulated (FM) radar waveform and a communication signal, such as an OFDM communication signal, for example. In an aspect, the PE-THoRaCs approach may utilize a two stage process. During a first stage, a shaping process may be iteratively executed against the FM radar waveform and the communication signal until a first stop criterion is satisfied and as a result of the iterative execution of the first stage, an initial composite radar and communication waveform having the communication signal embedded therein may be produced. During a second stage of the two stage process, an enhancement process may be iteratively executed against the initial composite radar waveform and the communication signal until a second stop criterion is satisfied to produce a final composite radar and communication waveform having the communication signal embedded therein.

The final composite radar and communication waveform may be suitable for use in both radar detection and data communication operations. For example, the final composite radar and communication waveform may be transmitted at high power by a transmitter, such as a transmitter of a radar system. Reflections or echoes of the transmitted final composite radar and communication waveform may be received at a receiver of the radar system and may be utilized by the radar system to perform radar detection operations, such as to detect one or more targets of interest. Additionally, a device possessing communication signal processing capabilities, such as OFDM signal demodulation, for example, may receive transmitted final composite radar and communication waveforms and extract data associated with the communication signal embedded therein. As described in more detail below, aspects of the PE-THoRaCs approach disclosed herein improve the capabilities of multi-function radar and communication systems by enabling a composite radar and communication waveform to be emitted at high power by a single transmitter, as opposed to utilizing two separate transmitters as required by the THoRaCs approach. Further, the concepts of the PE-THoRaCs approach also facilitate new functionality for wireless communication systems, such as enabling an OFDM communication signal to retain its OFDM structure when transmitted at high power. This may facilitate new signaling and transmission capabilities in wireless communication systems, such as cellular communication systems implementing $4^{th}$ Generation (4G)/long term evolution (LTE) and $5^{th}$ Generation (5G) new radio (NR) technologies that utilize OFDM-based signals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
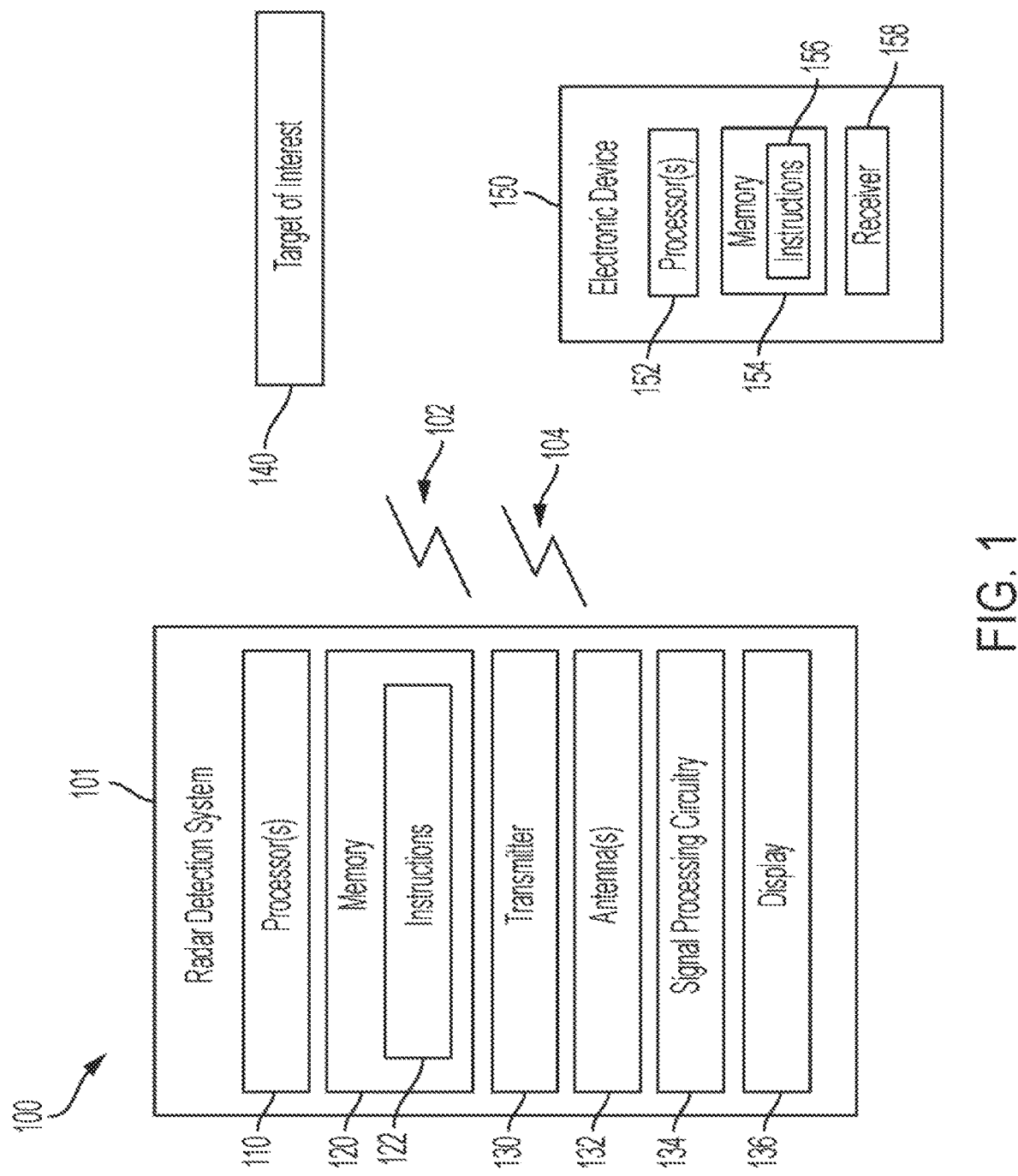
FIG. 1 is a block diagram of a system configured to generate a composite radar and communication waveform in accordance with aspects of the present disclosure.

Referring to FIG. 1, a block diagram of illustrating aspects of a system configured to generate a composite radar and communication waveform in accordance with aspects of the present disclosure is shown. As shown in FIG. 1 and described in more detail below, a radar detection system 101 may generate composite radar and communication waveforms in accordance with aspects of the PE-THoRaCs approach disclosed herein. The generated composite waveforms may be used by the radar detection system 101 to perform radar detection operations with respect to one or more targets of interest, such as target of interest 140. Additionally, the composite radar and communication waveforms may facilitate data communication and reception with respect to other devices, such as an electronic device 150.

As illustrated in FIG. 1, the radar detection system 101 may include one or more processors 110, a memory 120, a transmitter 130, one or more antennas 132, signal processing circuitry 134, and a display device 136. The one or more processors 110 may include one or more central processing units (CPUs), digital signal processors (DSPs), application specific integrated circuits (ASICs), field programmable gate arrays (FPGAs), or other circuitry configured to operate in accordance with aspects of the present disclosure. The transmitter 130 may be configured to transmit composite radar and communication waveforms. The one or more antennas 132 may be configured to receive reflections of transmitted composite radar and communication waveforms. The signal processing circuitry 134 may include various signal processing components, such as amplifiers, analog-to-digital converters, phase locked loops, mixers, a detector, a diplexer, gain control circuitry, low noise amplifiers (LNAs), other types of signal processing circuitry, or a combination thereof. It is noted that the exemplary types of signal processing circuitry described above have been provided for purposes of illustration, rather than by way of limitation and that the specific components of a radar detection system configured in accordance with the present disclosure may include less signal processing components, more signal processing components, or different signal processing components depending on the particular configuration or design of the radar detection system. The display device 136 may be configured to display information derived from the received reflections of the composite radar and communication waveforms, such as to display information associated a target of interest. As shown in FIG. 1, the memory 120 may store instructions 122 that, when executed by the one or more processors 110, cause the one or more processors 110 to perform operations for generating composite radar and communication waveforms in accordance with the present disclosure. For example, the instructions 122 may correspond to software that, when executed by the one or more processors 110, causes the one or more processors 110 to generate composite radar and communication waveforms utilizing a PE-THoRaCs approach. While aspects of the PE-THoRaCs techniques described below are suitable for implementation via software, it should be understood that the PE-THoRaCs approaches may be readily implemented in hardware if desired. Accordingly, the present disclosure is not to be limited to software implementations.

A pulsed FM radar waveform of duration T and bandwidth B (e.g., 3-dB) may be required to possess low autocorrelation sidelobes while also containing N embedded OFDM subcarriers modulated with arbitrary quadrature amplitude modulation (QAM) communication symbols. Being FM, the pulsed radar waveform may be naturally amenable to the rigors of a high-power radar transmitter. Due to their inherent non-unity peak-to-average power ratio (PAPR), OFDM-based signals are not typically transmitted at high power. As an example, operating a power amplifier in saturation may result in distortion and clipping effects being introduced into an OFDM-based signal transmitted at high power. Further, it may seem counterintuitive for an amplitude-modulated OFDM signal to be subsumed within the FM waveform; however, the two stage process described below facilitates this realization by exploiting the available degrees of freedom within the radar time-bandwidth product BT. It is to be noted that this effect is not accomplished using a constant-envelope OFDM scheme, which would require more complicated symbol decoding at the receiver. In contrast, a PE-THoRaCs radar emission may enable an electronic device having an OFDM symbol demodulation and decoding capability to receive data via the embedded communication signal based only on knowledge of the subcarrier spectral locations within the radar band.

The radar detection system 101 may be configured to generate (e.g., by the one or more processors 110 or the transmitter 130) a frequency modulated (FM) radar waveform and a communication signal. The communication signal may be an OFDM communication signal that includes one or more subcarriers and symbols that are to be embedded within the composite radar and communication waveform. Additionally, M unique pulsed waveforms may be constructed to form a radar coherent processing interval (CPI) yielding an overall time-bandwidth product of MBT. Each pulse may be configured or designed to approximate a desired power spectrum $|G(f)|^2$. In an aspect, the desired power spectrum may be Gaussian due to the associated Gaussian autocorrelation theoretically possessing no range sidelobes. The coherent combination of the echoes from these M pulses in a radar receiver (i.e., Doppler processing) may provide further range sidelobe suppression due to their incoherence.

To generate the composite radar and communication waveform, each pulsed waveform may be independently optimized based on a particular set of OFDM subcarriers and symbols to be embedded using a two-stage procedure. In a first stage, a shaping process may be iteratively executed against the FM radar waveform and the communication signal to produce an initial composite radar and communication waveform having the communication signal embedded therein. The shaping process may be iteratively executed until a first stop criterion is satisfied. In an aspect, the first stop criterion may comprise a pre-determined number of iterations (e.g., 2 iterations, 3 iterations, 10 iterations, 20 iterations, etc.) and the first stop criterion may be satisfied when the pre-determined number of iterations have been performed. In an aspect, the first stop criterion may comprise a metric associated with one or more characteristics of a current iteration of the initial composite radar and communication waveform (e.g., an autocorrelation property metric, an estimated peak sidelobe level (PSL), an integrated sidelobe level (ISL), or a frequency template error (FTE), a sufficient change in the waveform) and the first stop criterion may be satisfied when the metric associated with the one or more characteristics is equal to or within a threshold tolerance of a desired characteristic metric (e.g., the PSL metric is equal to or within a threshold percentage of a predetermined PSL metric, the ISL metric is equal to or within a threshold percentage of a predetermined ISL metric, the FTE metric is equal to or within a threshold variance of an FTE metric, and the like). After each iteration of the shaping process, a determination may be made as to whether the first stop criterion is satisfied, such as to evaluate whether the pre-determined number of iterations have been performed or whether a metric associated with the current iteration of the initial composite radar and communication waveform is equal to or within a threshold tolerance of the first stop criterion.

During the iterative shaping process, cyclic repetition of three projections may be performed, wherein each of the three projections corresponds to a waveform property, namely: 1) matching the desired spectral shape $|G(f)|^2$; 2) matching to a structure of the OFDM subcarriers; and 3) possessing a constant amplitude pulse shape of duration T. By repeated projection onto each of these sets, a pulsed waveform, referred to herein as the initial composite radar and communication waveform, having attributes of all three desired properties may be produced; however, the resulting pulsed waveform will often not completely satisfy all of the properties (e.g., if the sets do not intersect).

In the second stage, referred to herein as an enhancement process, additional processing may be iteratively executed against the initial composite radar waveform and the communication signal until a second stop criterion is satisfied and as a result of the second stage processing, a final composite radar and communication waveform may be produced. In an aspect, the second stop criterion may include a predetermined number of iterations (e.g., 2 iterations, 3 iterations, 10 iterations, 20 iterations, etc.) and the second stop criterion may be satisfied when the pre-determined number of iterations have been performed. In an aspect, the second stop criterion may comprise a metric associated with one or more characteristics of a current iteration of the final composite radar and communication waveform (e.g., an autocorrelation property metric, a estimated PSL metric, an ISL metric, a predicted error rate metric) and the second stop criterion may be satisfied when the metric associated with the one or more characteristics is equal to or within a threshold tolerance of a desired characteristic metric (e.g., the PSL metric is equal to or within a threshold percentage of a predetermined PSL metric, the ISL metric is equal to or within a threshold percentage of a predetermined ISL metric, the predicted error rate metric is equal to or within a threshold variance of a pre-determined error rate, and the like). After each iteration of the shaping process, a determination may be made as to whether the first stop criterion is satisfied, such as to evaluate whether the pre-determined number of iterations have been performed or whether a metric associated with the current iteration of the initial composite radar and communication waveform is equal to or within a threshold tolerance of the first stop criterion. The final radar and communication waveform may be a constant amplitude waveform having the communication signal embedded therein. It is noted that the term enhancement process is utilized to describe the second stage processing because the second stage may ignore the spectral shape of the final radar and communication waveform and focus instead on enhancing or improving the embedding of the communication signal into a constant amplitude pulse of length T. In an aspect, spectral shaping of the final composite radar and communication waveform may be ignored during the second stage. For example, the first stage of cyclic projections may produce a signal (e.g., the initial composite radar and communication signal) that sufficiently approximates the desired spectral shape (which may be a less stringent requirement due to the coherent receive processing over the radar CPI). This may enable the second stage to emphasize or enhance the stricter requirements of realizing undistorted communications and enforcing a finite pulse shape that may be more amenable to high-power transmission by the transmitter 130. Having broadly described the two-stage process for generating composite radar and communication waveforms in accordance with the PE-THoRaCs techniques of the present disclosure, a more detailed explanation of each stage will now be described.

As explained above, during the first stage, a shaping process may be iteratively executed against the FM radar waveform and the communication signal to produce the initial composite radar and communication waveform. During each iteration of the shaping process, three different projections may be performed to control/modify characteristics or properties (e.g., spectral shape, structure of embedded OFDM subcarriers, and constant amplitude pulse shape) of the resulting initial composite radar and communication waveform. An mth pulse of the set of M pulsed waveforms, defined over $-T/2 \le t \le +T/2$, may be initialized with the FM waveform, which may be denoted as $s_{0,m}(t)$. In an aspect, the FM waveform may be generated via a random instantiation of a polyphase-coded FM (PCFM) waveform. For the mth pulse, let $r_m(t)$ for $-T/2 \le t \le +T/2$ be the communication signal, which may be defined for N subcarriers as:

$$r_m(t) = \sum_{n=0}^{N-1} a_{m,n} |c_{m,n}| \exp[j(2\pi f_{m,n} t + \angle c_{m,n})], \quad (1)$$

where $f_{m,n}$ is the frequency of the nth subcarrier, $c_{m,n}$ is the quadrature amplitude modulation (QAM) symbol encoded onto the nth subcarrier, $\angle(\cdot)$ is the phase of the argument, and $a_{m,n}$ is amplitude scaling that shapes the spectrum for the nth subcarrier.

During the shaping process, the FM waveform may be subjected to the aforementioned three projections repeated cyclically, for $k^{th}$ cycle index. The first projection may be configured to impose spectral shaping according to:

$$b_{k,m}(t) = F^{-1}\{|G(f)| \exp(j \angle F\{s_{k,m}(t)\})\}, \quad (2)$$

where F and $F^{-1}$ represent the Fourier and inverse Fourier transforms, respectively. In equation (2), the FM waveform $s_{k,m}(t)$ is being projected onto the set of M pulsed waveforms having the power spectrum $|G(f)|^2$.

The second projection of the first stage may concurrently enforce a notch in the radar spectrum and insert the communication signal within the notch via:

$$\tilde{b}_{k,m}(t) = P_{\perp r_m}\{b_{k,m}(t)\} + r_m(t). \quad (3)$$

In equation (3), the operator $P_{\perp r_m}\{\cdot\}$ projects the argument onto the orthogonal complement of the subcarrier frequencies in the communication signal $r_m(t)$. In an aspect, the notch may be formed by setting the values of the frequency spectrum of $b_{k,m}(t)$ corresponding to the subcarrier frequencies in the communication signal $r_m(t)$ equal to zero. It is noted that while both THoRaCs and PE-THoRaCs may utilize a notch, the manner in which the notch is utilized by these two techniques, as well as the depth of the notch, are different. For example, in THoRaCs the notch is used to define a window within a waveform transmitted by a high-power radar transmitted during which an OFDM signal may be transmitted by a second transmitter. In contrast, the notch of the PE-THoRaCs is utilized to embed the OFDM signal within a radar waveform, thereby facilitating transmission of the composite radar and communication waveform by a single high power transmitter. Additionally, the depth of the notch utilized in the THoRaCs approaches is greater than the depth of the notch utilized by the PE-THoRaCs. For example, the THoRaCs approach may utilize notches of –40-50-dB while the PE-THoRaCs approach may utilize notches of –10-20-dB. The performance of the THoRaCs approach would be degraded by the shallower notches utilized by the PE-THoRaCs approach. It is noted that while the general performance of the THoRaCs would be degraded by the shallower notches utilized by the PE-THoRaCs approach disclosed herein, the degree of degradation may depend on several factors, such as the spectral location of the notch and the OFDM sub carriers.

At this point it is unlikely that the output generated by the second projection, $\tilde{b}_{k,m}(t)$, is a constant amplitude waveform or strictly limited to a pulsewidth of T. The third projection may be configured to satisfy these two constraints via the application of:

$$s_{k+1,m}(t) = \begin{cases} \exp(j \angle \tilde{b}_{k,m}(t)) & |t| \le T/2 \\ 0 & |t| > T/2 \end{cases}. \quad (4)$$

The above-described sequence of projections may be repeated K times to produce an initial composite radar and communication waveform, which may be a constant amplitude waveform and is denoted herein as $s_{K,m}(t)$. In an aspect, K may be determined based on the first stop criterion. The first stop criterion may be associated with a pre-determined number of iterations, or metric associated with a current iteration of the initial radar and communication waveform, such as an autocorrelation property metric, a PSL metric, an ISL metric, an FTE metric, a predicted error rate, or a sufficient change in the waveform, which may evaluated according to $\|s_{k+1,m}(t) - s_{k,m}(t)\|^2 < \delta$. After each iteration of the three projections described above, the properties/characteristics of the initial composite radar communication waveform, as generated by a current iteration of the shaping process, may be evaluated against the first stop criterion to determine whether the first stop criterion is satisfied. If the first stop criterion is satisfied, the first stage is complete and the second stage may be performed. If the first stop criterion is not satisfied, the shaping process may be executed for another iteration.

As explained above, during the second stage, an enhancement process may be iteratively executed against the initial composite radar waveform and the communication signal to produce a final composite radar and communication waveform suitable for transmission by the transmitter 130. During each iteration of the enhancement process, two different projections may be performed with respect to the initial composite radar waveform and the communication signal to control/modify characteristics or properties, such as a structure of the embedded OFDM subcarriers and a constant amplitude pulse shape of the final composite radar and communication waveform. The second optimization stage uses cycle index $l$ and may be initialized as $\tilde{s}_{l=0,m}(t)=s_{K,m}(t)$, followed by L iterations of:

$$d_{l,m}(t)=P_{\perp r_m}\{\tilde{s}_{l,m}(t)\}+r_m(t) \qquad (5)$$

$$\tilde{s}_{\ell+1,m}(t) = \begin{cases} \exp(jLd_{\ell,m}(t)) & |t| \le T/2 \\ 0 & |t| > T/2 \end{cases} \qquad (6)$$

Similar to (3), in (5), the operator $P_{\perp r_m}\{\bullet\}$ projects the argument onto the orthogonal complement of the subcarrier frequencies in the communication signal $r_m(t)$, thereby embedding the communication signal within the resulting waveform $d_{l,m}(t)$. After each iteration according to equation (5), the constant amplitude and/or the pulsewidth characteristics/properties of $d_{l,m}(t)$ may be enhanced according to equation (6). In an aspect, L may be determined based on the second stop criterion. The second stop criterion may be associated with one of an autocorrelation property associated with the final radar and communication waveform, a PSL metric associated with the final radar communication waveform, and a predicted error rate associated with the final radar communication waveform, which may be evaluated using an estimated communications signal mean-square error, $\|(\tilde{s}_{lm}(t)-P_{\perp r_m}\{\tilde{s}_{lm}(t)\})-r_m(t)\|^2 < 6.$] After each iteration of the two projections described above (e.g., equations (5) and (6)), the properties/characteristics of the final composite radar communication waveform, as generated by a current iteration of the enhancement process, may be evaluated against the second stop criterion to determine whether the first stop criterion is satisfied. If the second stop criterion is satisfied, the second stage is complete and the final composite radar and communication waveform may be transmitted by the transmitter 130. If the second stop criterion is not satisfied, the shaping process may be executed for another iteration. It has been found that, as long as the number of subcarriers is not too large a fraction of the waveform BT, the sets of signals resulting from the projections illustrated in equations (5) and (6) nearly always intersect. This means that $\tilde{s}_{l,m}(t)$ converges to a constant amplitude waveform of duration T that contains an OFDM communication signal and a spectrum shape that only marginally deviates from that realized in the first stage. As shown above, the PE-THoRaCs process described above facilitates creation of a constant amplitude waveform suitable for radar detection processing operations and having an OFDM communication signal embedded therein.

It is noted that the communication symbols in $r_m(t)$ can be drawn from arbitrary constellations, even those that possess amplitude modulation (e.g., higher order QAM). The two-stage optimization process utilized by PE-THoRaCs may still realize a constant amplitude waveform by exploiting degrees of freedom contained in the waveform BT that are not associated with a subcarrier and corresponding symbol. Additionally, it is noted that when the number of embedded subcarriers exceeding a portion of the waveform time-bandwidth product increases, it may become more difficult to find a solution that satisfies both equations (5) and (6). Such instances may still produce viable radar waveforms, but an increase in the number of distortion-induced symbol errors may occur depending on how much the final application of (6) causes the waveform to deviate from satisfying (5).

As illustrated in FIG. 1, once generated, the final composite radar and communication waveform may be transmitted as an output radar emission 102 by the transmitter 130. The output radar emission 102 may be suitable for performing radar detection operations with respect to one or more targets of interest. For example, the output radar emission 102 may be reflected by the one or more targets of interest, and the reflections may be received as echoes 104 at the one or more antennas 132. Signaling processing circuitry 134 may be configured to process the received echoes 104 to facilitate radar detection operations with respect to the one or more targets of interest, such as detecting/tracking a target of interest 140. In an aspect, the radar detection operations may include displaying information associated with detected or tracked targets of interest at the display device 136.

Additionally, the output radar emission 102 may facilitate data communication. For example, in FIG. 1, an electronic device 150 is shown. The electronic device 150 includes one or more processors 152, a memory 154, and a receiver 158. Additionally, the memory 154 may store instructions 156 that, when executed by the one or more processors 152, cause the one or more processors 152 to perform operations for extract data from signals received by receiver 158. The electronic device 150 may include an OFDM signal processing capability that enables the electronic device to receive, demodulate, and decode symbols associated with OFDM signals. The electronic device 150 may be configured to receive the transmitted final composite radar and communication signal at the receiver 158 (e.g., the output emission 102) and to extract data from the OFDM communication signal embedded within the final composite radar and communication waveform using the OFDM capability.

Figure 2:
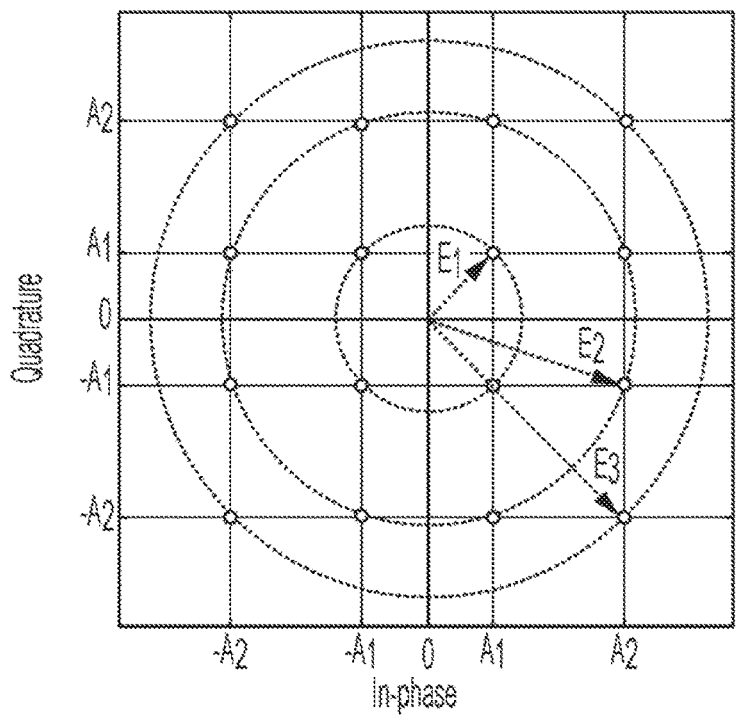
FIG. 2 is a diagram illustrating a signal constellation.

In an aspect, three design parameters, which can be varied, may be taken into consideration when determining or generating the communication signal $r_m(t)$. These parameters are: 1) the symbol constellation; 2) the number of OFDM subcarriers N relative to waveform BT; and 3) the placement strategy of these subcarriers within the radar spectrum. While there are myriad different possible symbol constellations, the three symbol constellations that are commonly used in conjunction with OFDM are 4-QAM, 16-QAM, and 64-QAM. The 4-QAM arrangement is the simplest as it is just a $\pi/4$ phase rotation of quadrature phase-shift keying (QPSK) and thus possesses only one symbol energy level since all the symbols reside on a single amplitude circle. In contrast, the 16-QAM constellation possesses 4 possible amplitude values for each of the in-phase and quadrature-phase components, as shown in FIG. 2, which collectively correspond to 3 different energy levels. Likewise, the 64-QAM constellation (not illustrated in the drawings) involves 8 possible in-phase and quadrature-phase amplitude values, resulting in 9 different symbol energy levels. It is noted that the presence of multiple subcarriers, along with the M unique pulsed waveforms, allows these differing energy levels to partially average out to achieve a desired radar spectrum $|G(f)|^2$. This desired attribute may be further ensured by the use of frequency hopping, discussed in more detail below. In an aspect, the number of subcarriers N may be defined as a percentage of the waveform time-bandwidth product BT. Below, percentages of 25%, 50%, and 75% are evaluated. Higher % BT may be expected to cause more distortion-induced symbol errors, particularly for denser constellations, since it becomes more difficult to meet all the waveform design requirements. In the description that follows, it may be assumed that each subcarrier conveys a data-rate of only 1 symbol/pulse, however, higher values could be utilized. Thus, the symbol/pulse rate may be utilized by the system 100 as an additional parameter that could be varied.

In the examples described below, three different strategies for the placement of OFDM subcarriers in the radar waveform are examined. For all three strategies, the N subcarriers are confined to reside in the 3-dB bandwidth B of the waveform. In the first strategy, referred to as "Contiguous Fixed," the subcarriers occupy N contiguous frequencies at a fixed spectral location for all M pulses. For the second strategy, referred to as "Contiguous Hopped," the subcarriers again occupy N contiguous frequencies, but their spectral location is randomly changed within B for each pulse. The third strategy, referred to as "Non-contiguous Hopped," allows the N subcarriers to occupy non-contiguous spectral locations that are randomized for each pulse. It is noted that a communication receiver, such as the receiver 158 of the electronic device 150, may need to know the hopping patterns when the $2^{nd}$ and/or $3^{rd}$ strategies are utilized.

In the context of typical radar operating specifications and the above-described communication design values, one can determine the total data rates that are achievable. For example, consider BT=200, a pulse repetition frequency (PRF) of 10 kHz, and assume a per subcarrier data rate of 1 symbol/pulse. Thus 25% BT occupancy (N=200×0.25=50) and 4-QAM (2 bits/symbol) would yield a total data rate of 1 Mb/s, while 75% BT (N=200×0.75=150) and 64-QAM (6 bits/symbol) would provide 9 Mb/s. However, the latter parameterization may be impractical because there may be insufficient design degrees of freedom to meet all the requirements.

Below, performance of individual radar and communication attributes of different dual-function waveforms (e.g., combination radar and communication waveforms) generated utilizing PE-THoRaCs techniques are described. The efficacy of these dual-function waveforms as a useful radar waveform was assessed using the mean autocorrelation over the CPI of M pulses, the RMS spectral content over the CPI, and the point-spread function obtained by performing pulse compression and Doppler processing for a hypothetical point scatterer. The communication performance is evaluated using the symbol error rate (SER).

For these assessments, there are $M=10^4$ unique pulsed waveforms, each with BT=200, thus yielding an overall time-bandwidth product of $2×10^6$ for the entire CPI, which provides a coherent integration gain of 63 dB. Along with the symbol constellations of 4-QAM, 16-QAM, and 64-QAM, the % BT values of 25%, 50%, and 75% correspond to N=50, 100, and 150 subcarriers per pulse, respectively. The "Contiguous Fixed" version of each of these configurations occupies a spectral interval in the center of the radar passband. The "Contiguous Hopped" and "Non-contiguous Hopped" subcarriers were randomly assigned within B on an independent basis for each pulse.

Figure 3:
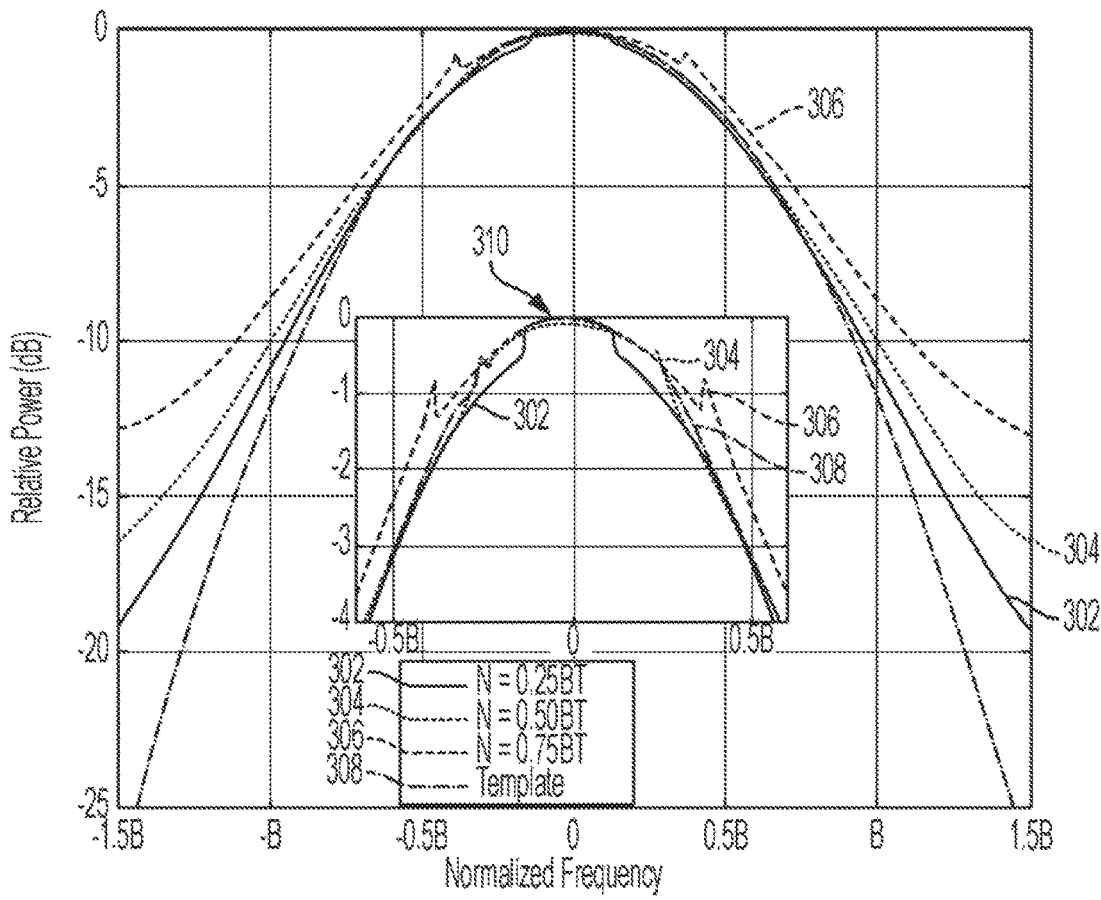
FIG. 3 is a diagram illustrating spectral characteristics of a signal generated in accordance with aspects of the present disclosure.

Referring to FIG. 3, a diagram illustrating the RMS spectra averaged over all $M=10^4$ pulses for a 4-QAM constellation with subcarriers placed in a Contiguous Fixed manner is shown. In FIG. 3, line 302 represents a waveform utilizing a 25% BT, line 304 represents a waveform utilizing a 50% BT, line 306 represents a waveform utilizing a 75% BT, and line 308 illustrates the desired Gaussian spectral template. From FIG. 3, it is readily apparent that a better match to the desired spectral shape is achieved when the number of embedded OFDM subcarriers is a smaller percentage of the waveform BT. The spectra passbands are shown in detail at inset 310, in which similar line numbers represent the spectra passbands for the respective % BT values. The inset 310 indicates the most significant deviation occurs due to increased % BT.

Figure 4:
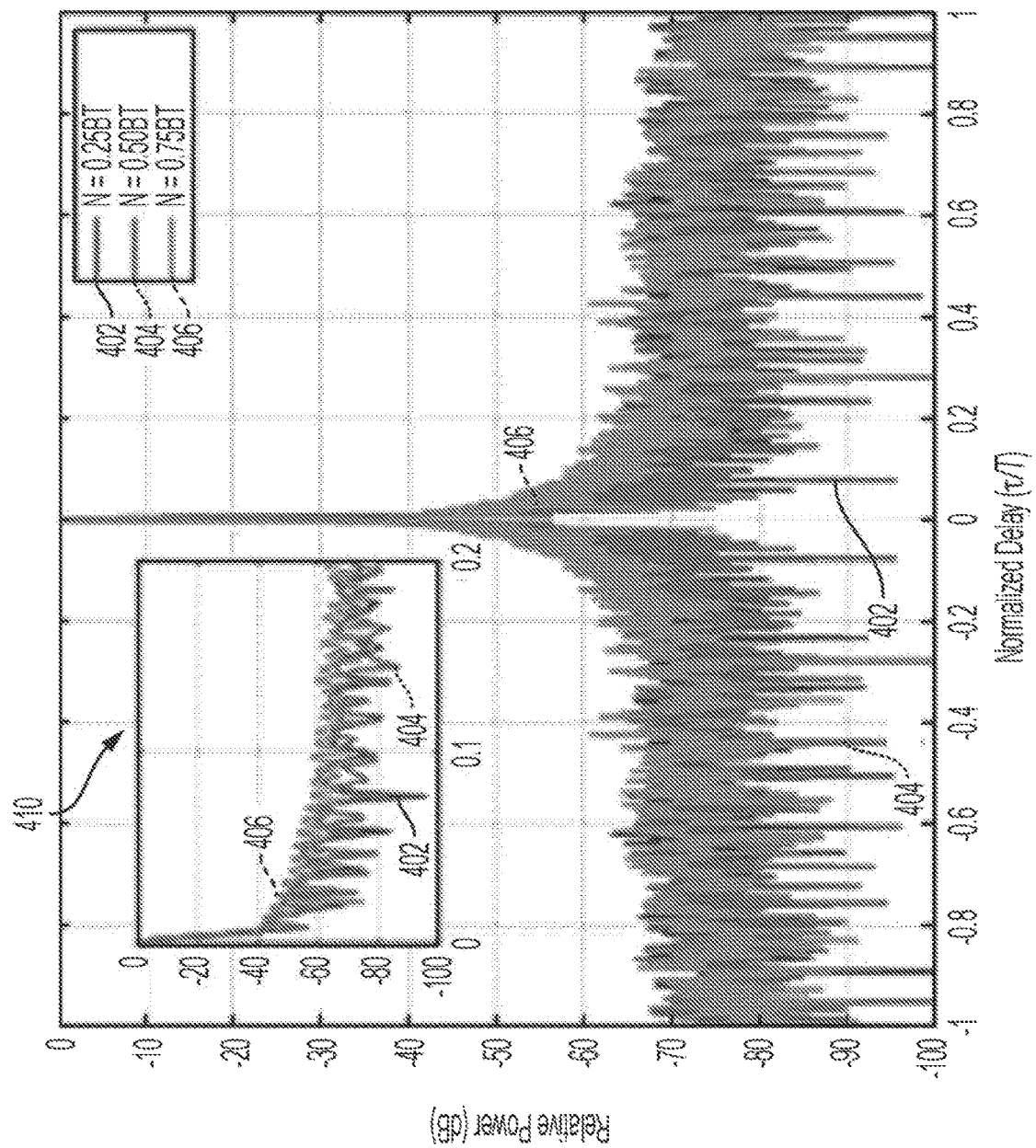
FIG. 4 is a diagram illustrating autocorrelation properties of a signal generated in accordance with aspects of the present disclosure.

Referring to FIG. 4, a diagram illustrating the mean autocorrelation across all $M=10^4$ pulses (i.e. Doppler processing at zero Doppler) corresponding to the RMS spectra illustrated in FIG. 3 is shown, with line 402 representing the mean autocorrelation of a waveform utilizing a 25% BT, line 404 representing the mean autocorrelation of a waveform utilizing a 50% BT, and line 406 representing the mean autocorrelation of a waveform utilizing a 75% BT. Inset 410 illustrates the range sidelobe response near the mainlobe, and similar line numbers represent the range sidelobes of the waveforms utilizing the respective % BT values. As shown in inset 410, marginally lower sidelobes may be obtained for the waveforms with a smaller number of subcarriers, which is due to the better approximation to a Gaussian spectrum. It has been observed that the RMS spectra and mean autocorrelation responses for "Contiguous Fixed" subcarrier placement do not appreciably differ for the 16-QAM and 64-QAM constellations.

Figure 5:
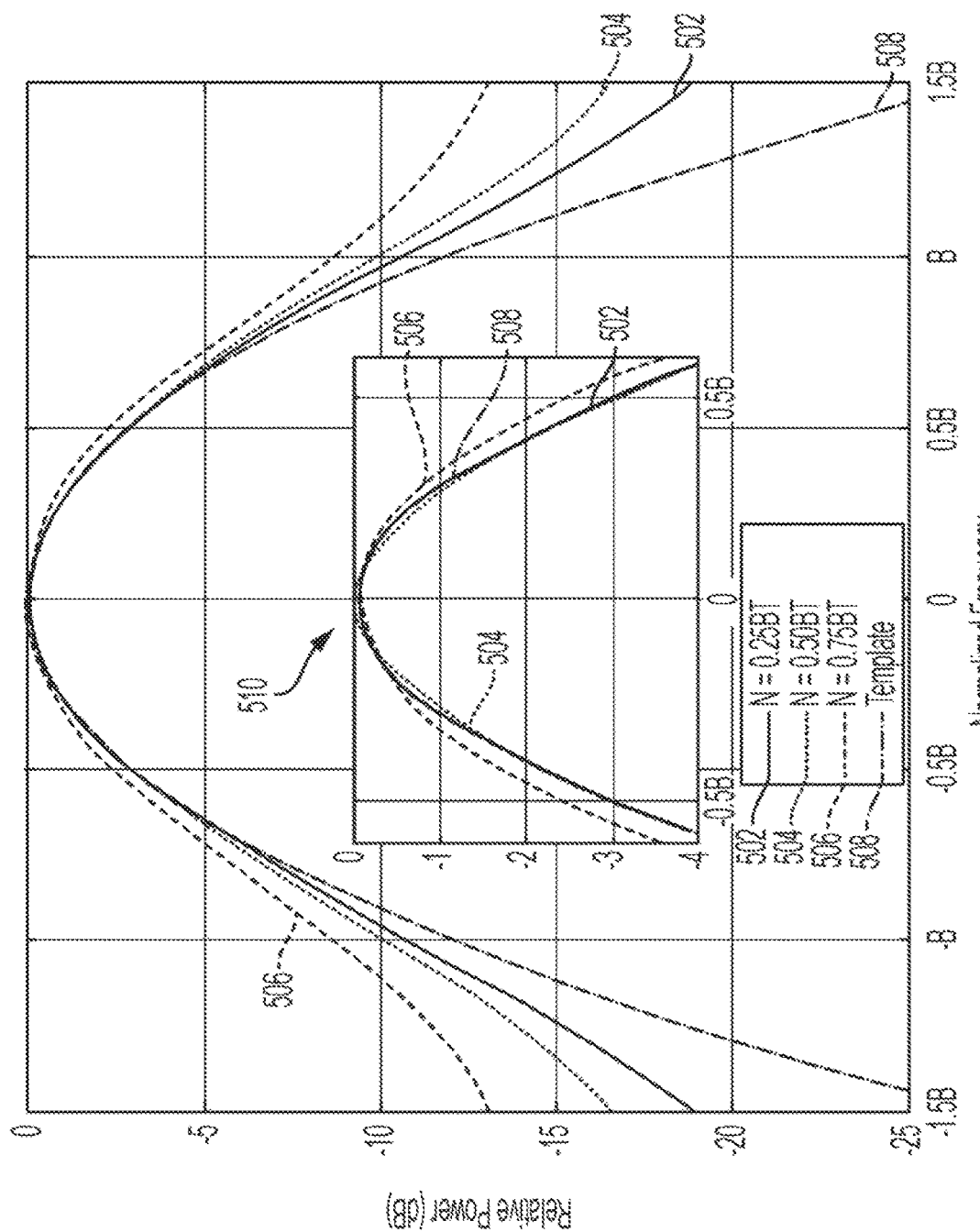
FIG. 5 is a diagram illustrating spectral characteristics of a signal generated in accordance with aspects of the present disclosure.
Figure 6:
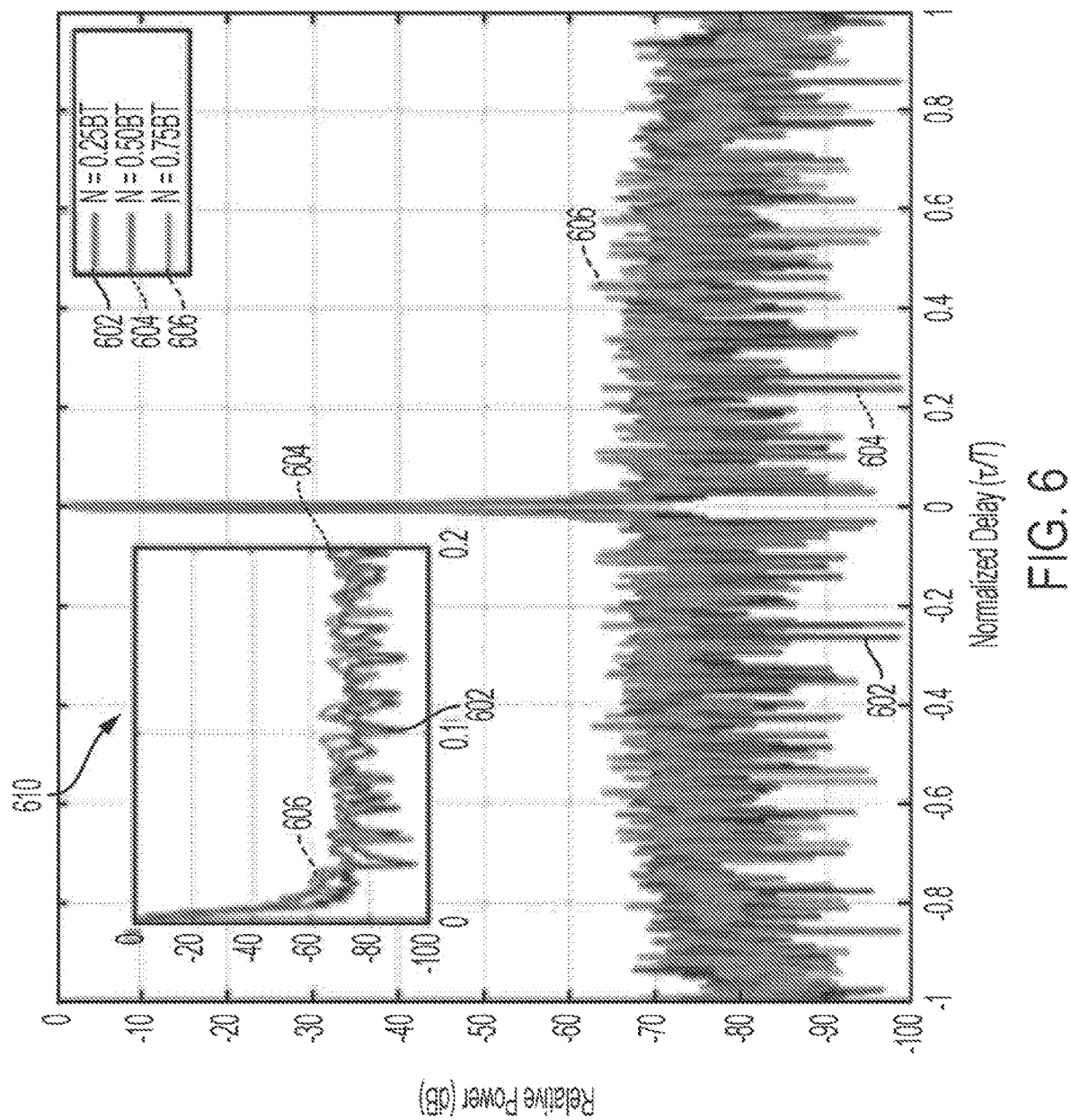
FIG. 6 is a diagram illustrating autocorrelation properties of a signal generated in accordance with aspects of the present disclosure.

Referring to FIG. 5, a diagram illustrating the RMS spectra for a 64-QAM constellation with "Contiguous Hopped" subcarriers is shown. In FIG. 5, line 502 represents a waveform utilizing a 25% BT, line 504 represents a waveform utilizing a 50% BT, line 506 represents a waveform utilizing a 75% BT, and line 508 illustrates the desired Gaussian spectral template. As can be observed from FIG. 5, a smaller number of subcarriers (e.g., a smaller % BT) yields a spectrum that more closely matches the Gaussian template. In FIG. 5, the spectra passbands are shown in detail at inset 510, in which similar line numbers represent the spectra passbands for the respective % BT values. The spectra passbands illustrated at inset 510 can be seen to have a much smoother response than that observed for "Contiguous Fixed" subcarriers (shown in FIG. 3), though the 75% BT still realizes some broadening. Similar to the description of FIG. 4, above, the mean autocorrelation for "Contiguous Hopped" subcarriers is illustrated in the diagram of FIG. 6, with line 602 representing the mean autocorrelation of a waveform utilizing a 25% BT, line 604 representing the mean autocorrelation of a waveform utilizing a 50% BT, and line 606 representing the mean autocorrelation of a waveform utilizing a 75% BT. FIG. 6 demonstrates a trend of modestly lower sidelobes for waveforms utilizing a decreased % BT, similar to the results illustrated in FIG. 4.

Figure 7:
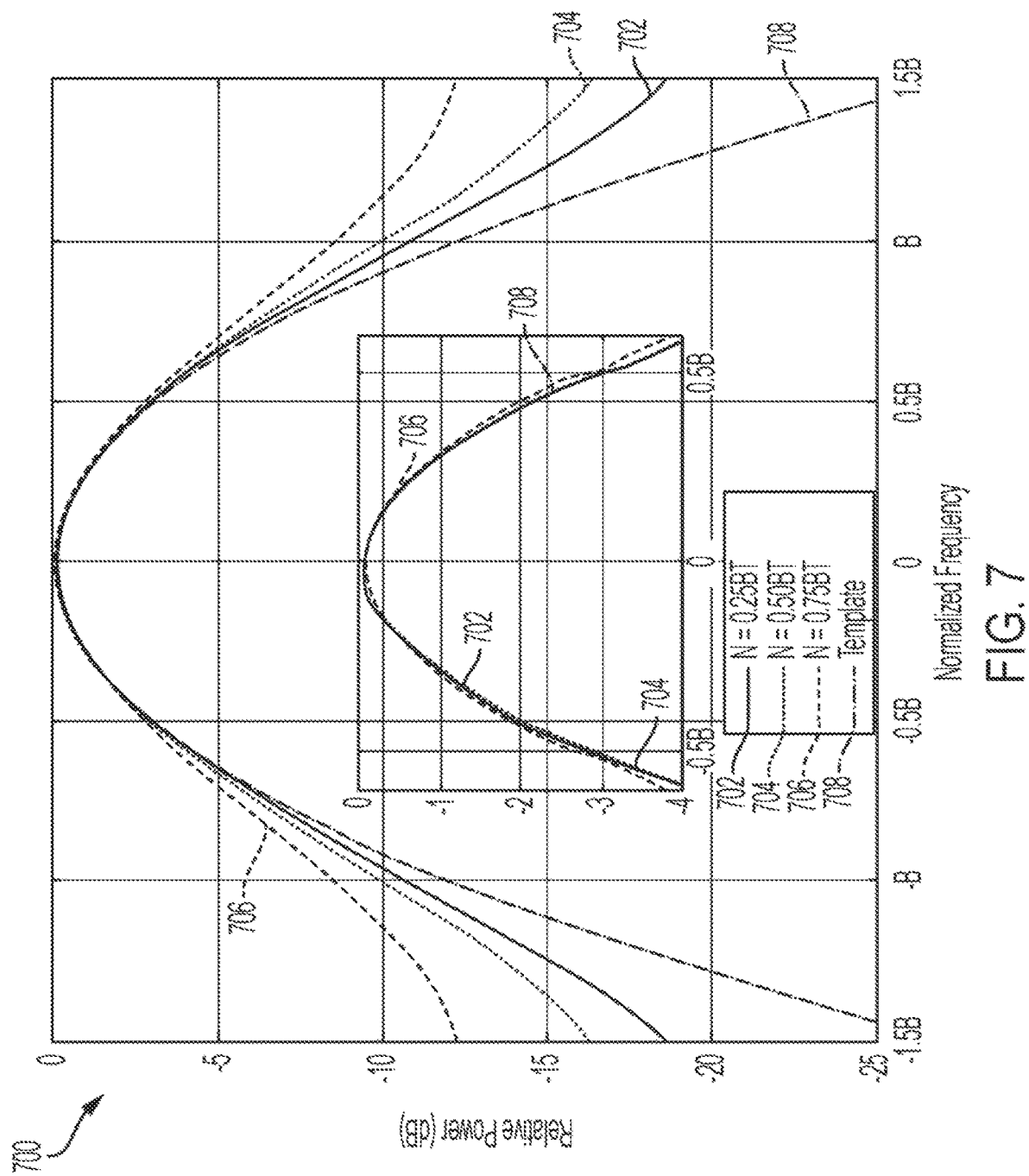
FIG. 7 is a diagram illustrating spectral characteristics of a signal generated in accordance with aspects of the present disclosure.
Figure 8:
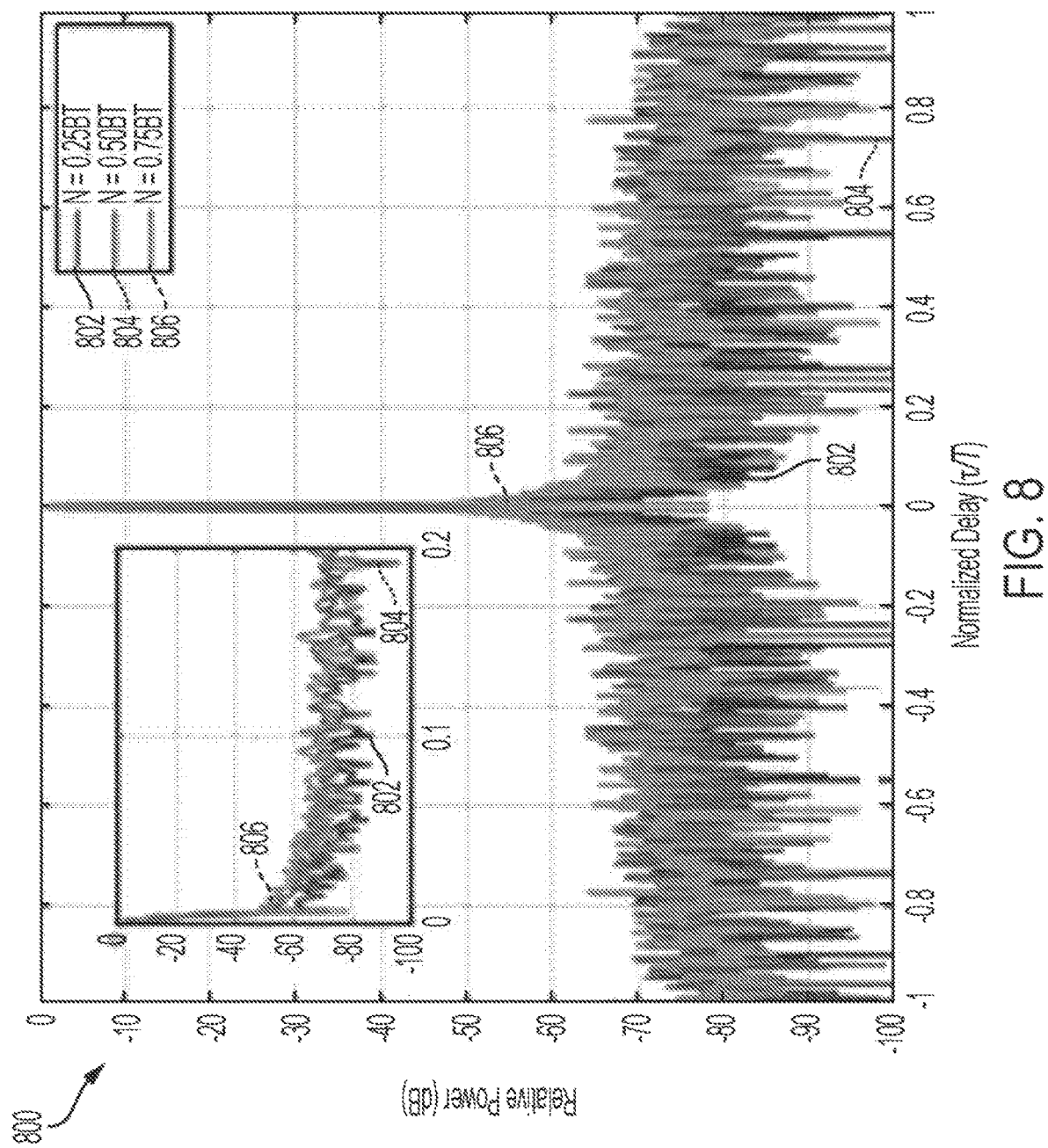
FIG. 8 is a diagram illustrating autocorrelation properties of a signal generated in accordance with aspects of the present disclosure.

Referring to FIG. 7, a diagram illustrating the RMS spectra for a 64-QAM constellation with "Non-contiguous Hopped" subcarriers is shown. In FIG. 7, line 702 represents a waveform utilizing a 25% BT, line 704 represents a waveform utilizing a 50% BT, line 706 represents a waveform utilizing a 75% BT, and line 708 illustrates the desired Gaussian spectral template. In FIG. 7, it is again observed that using a smaller number of subcarriers yields a mean spectrum that more closely approximates the Gaussian template. Additionally, the inset 710 also shows a better passband fit to the template for all values of N than was achieved for either of the contiguous subcarrier cases. Likewise, FIG. 8 illustrates a diagram demonstrating the mean autocorrelation for "Non-contiguous Hopped" subcarriers, with line 802 representing the mean autocorrelation of a waveform utilizing a 25% BT, line 804 representing the mean autocorrelation of a waveform utilizing a 50% BT, and line 806 representing the mean autocorrelation of a waveform utilizing a 75% BT. Once again, a more favorable autocorrelation response is obtained for the smaller number of subcarriers due to a better approximation of the spectral template. It is noted that although the 4-QAM and 16-QAM results are not shown, their spectra was not appreciably different and the 64-QAM autocorrelation sidelobes were, by a small margin, the worst of the three.

Figure 9:
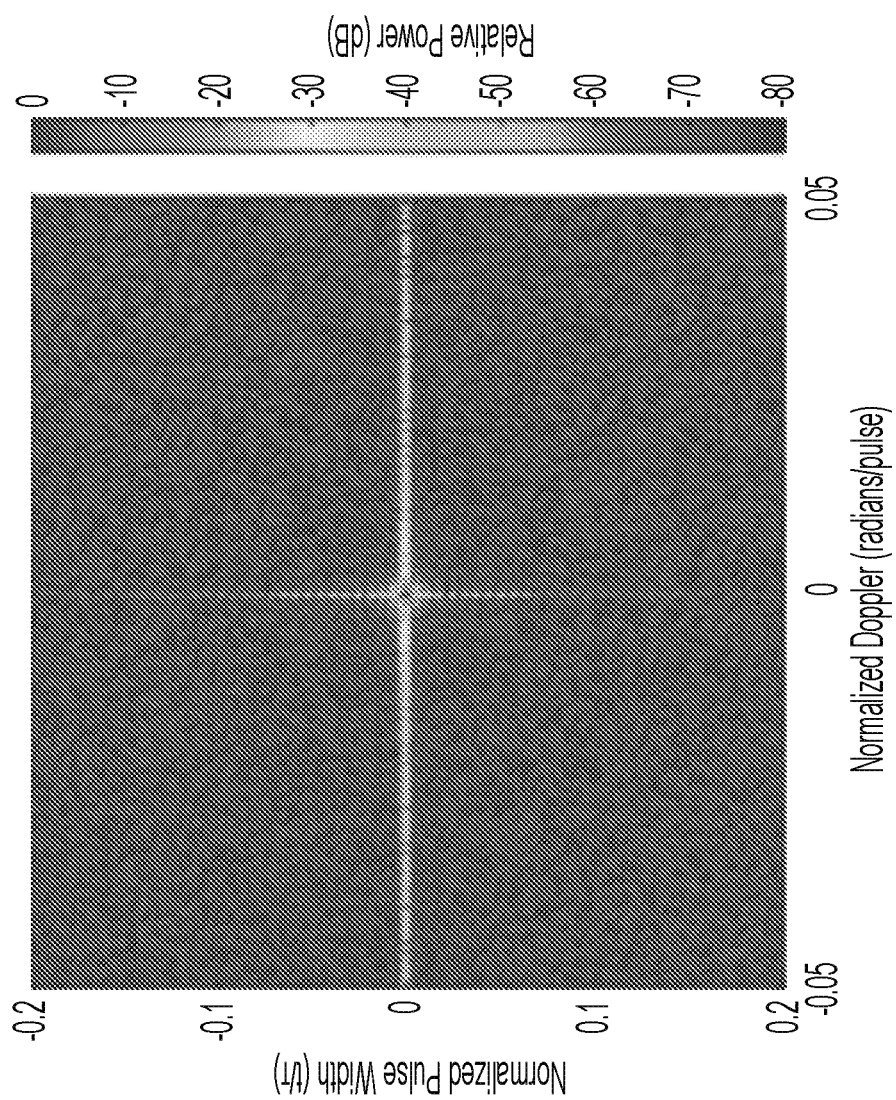
FIG. 9 is a diagram illustrating a delay-Doppler point-spread function for a signal generated in accordance with aspects of the present disclosure.

The take away from the results illustrated in FIGS. 3-8 is that, aside from some relatively small differences in passband spectra and very modest changes in what are still quite low sidelobe levels, the performance, from a radar perspective, of the combination radar and communication waveforms generated in accordance with the PE-THoRaCs approach disclosed herein is essentially unaffected by the amount of communication content incorporated into the radar waveform or how the subcarriers are allocated within the radar spectrum. Further, if we take the worst performing use case, namely N=75% BT "Contiguous Fixed" subcarriers with a 4-QAM constellation, the resulting point-spread function (pulse compressed and Doppler processed across the M pulses), illustrated in FIG. 9, shows a response with very low delay/Doppler sidelobes outside the usual zero-delay sin(x)/x Doppler sidelobes, which can be easily reduced by Doppler windowing across the pulses.

One factor that may contribute to the small impact that inclusion of OFDM subcarriers has on radar performance for PE-THoRaCs-based waveforms is that they are already a form of FM noise radar. The communication component may vary the structure of the waveforms but due to the two stage process utilized to generate the combination radar and communication waveforms, they generally retain a Gaussian-like power spectrum and are sufficiently unique from pulse-to-pulse, and as a result the autocorrelation and point-spread performance remains satisfactory.

To characterize the communication performance of dual-function waveforms generated according to the PE-THoRaCs approach disclosed herein, the SER of various configurations of PE-THoRaCs-based combination radar and communication waveforms were evaluated. Each possible combination of the three subcarrier placement strategies, the three symbol constellations, and the three % BT values were considered. During the evaluations, additive complex Gaussian white noise (AWGN) was generated and added to each waveform and varied as a function of average SNR from −10 dB to +30 dB. The results of the evaluations are illustrated in FIGS. 10-12, which are described in more detail below.

Figure 10:
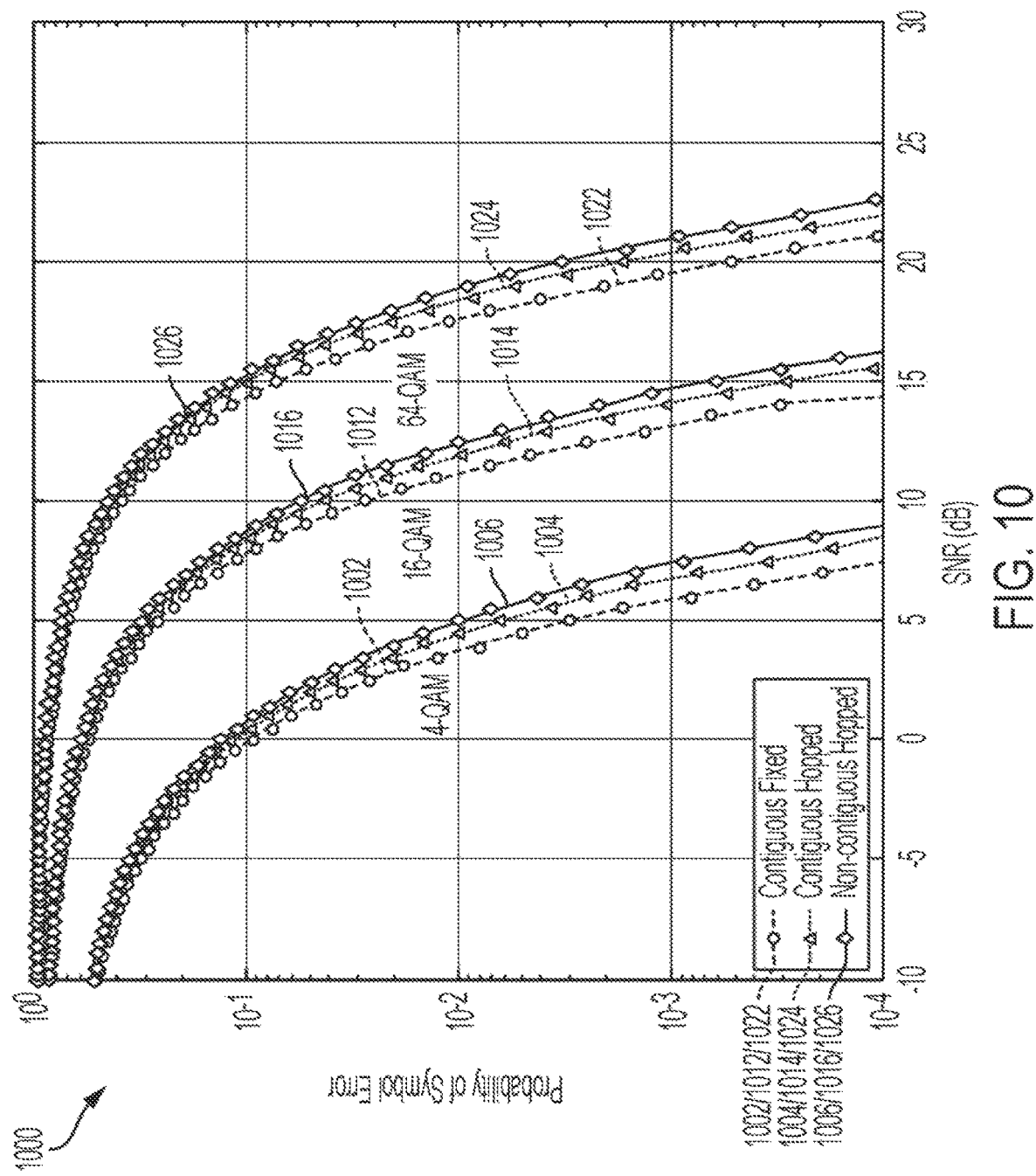
FIG. 10 is a diagram illustrating a symbol error rate associated with a signal generated in accordance with aspects of the present disclosure.

Referring to FIG. 10, a diagram illustrating SER waterfall plots for all three symbol constellations and all three subcarrier placement strategies when N=25% BT are shown. In FIG. 10, lines 1002, 1012, and 1022 represent the "Contiguous Fixed" subcarrier placement strategy, lines 1004, 1014, 1024 represent the "Contiguous Hopped" subcarrier placement strategy, and lines 1006, 1016, 1026 represent the "Non-contiguous Hopped" subcarrier placement strategy. Additionally, lines 1002, 1004, 1006 correspond to a 4-QAM symbol constellation, lines 1012, 1014, 1016 correspond to a 16-QAM symbol constellation, and lines 1022, 1024, 1026 correspond to a 64-QAM symbol constellation. As shown in FIG. 10, a higher constellation density requires a higher SNR to achieve the same SER. While some of the SNR values illustrated in FIG. 10 appear quite high, it is to be appreciated that these signals are designed for emission by a high-power radar transmitter, which could very well involve megawatts of peak power. It is also observed that the "Contiguous Fixed" subcarrier arrangement is consistently better in terms of SER, which may be realized by the placing of those subcarriers around the center of the passband where the spectral power content is highest.

It is also important to note that a single bit error produces a symbol error, and thus higher order constellations are disproportionately penalized when assessing SER. Converting to bit error rate (BER) can be more meaningful from a communication perspective, but the formulation of SER in terms of SNR is more convenient when considering the interaction with radar, which is likewise posed in terms of SNR. In an aspect, error correction coding and/or gray coding may be utilized to mitigate some of the excessive penalty caused by symbol error rates in high-order constellations.

Figure 11:
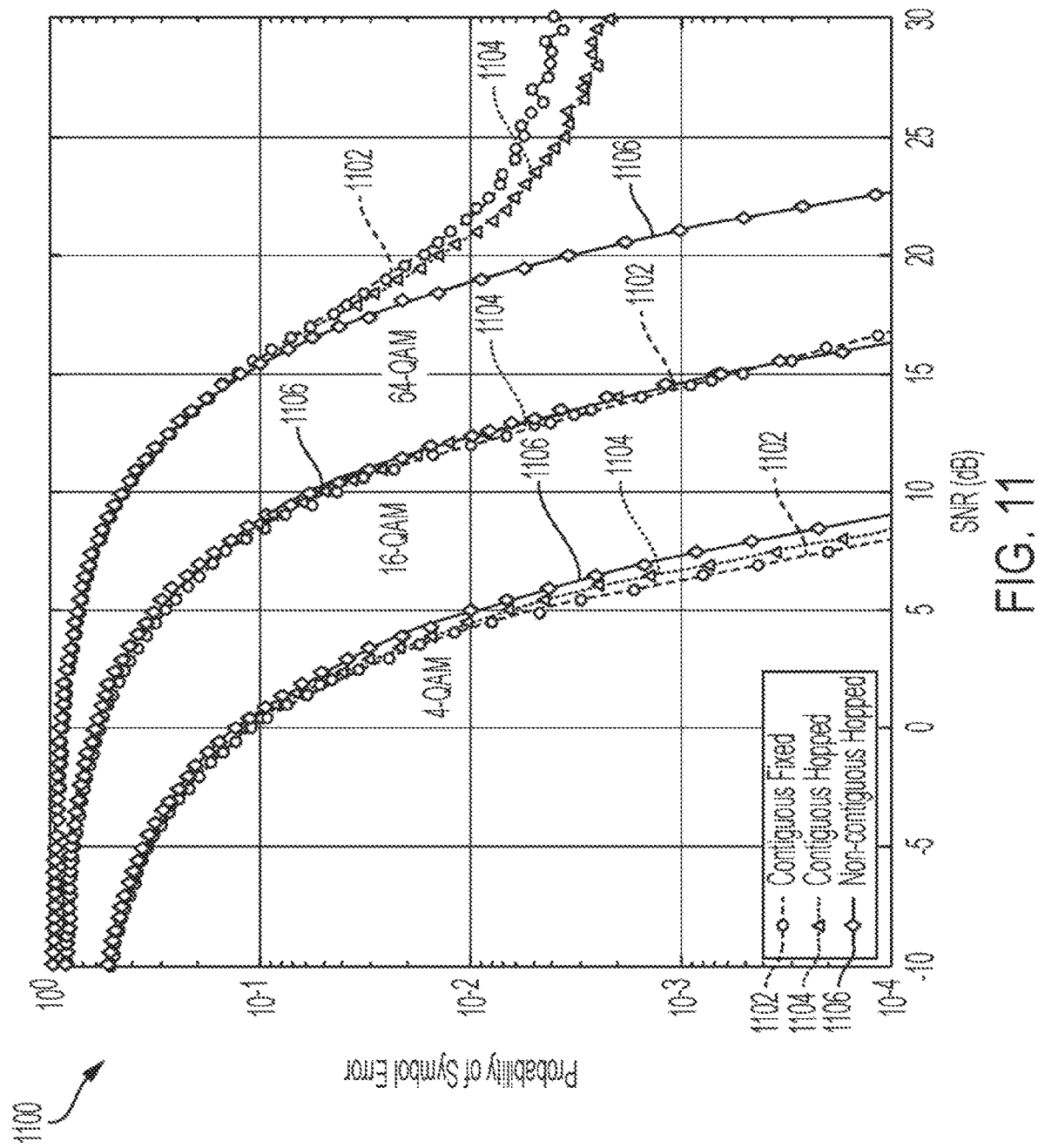
FIG. 11 is a diagram illustrating a symbol error rate associated with a signal generated in accordance with aspects of the present disclosure.
Figure 12:
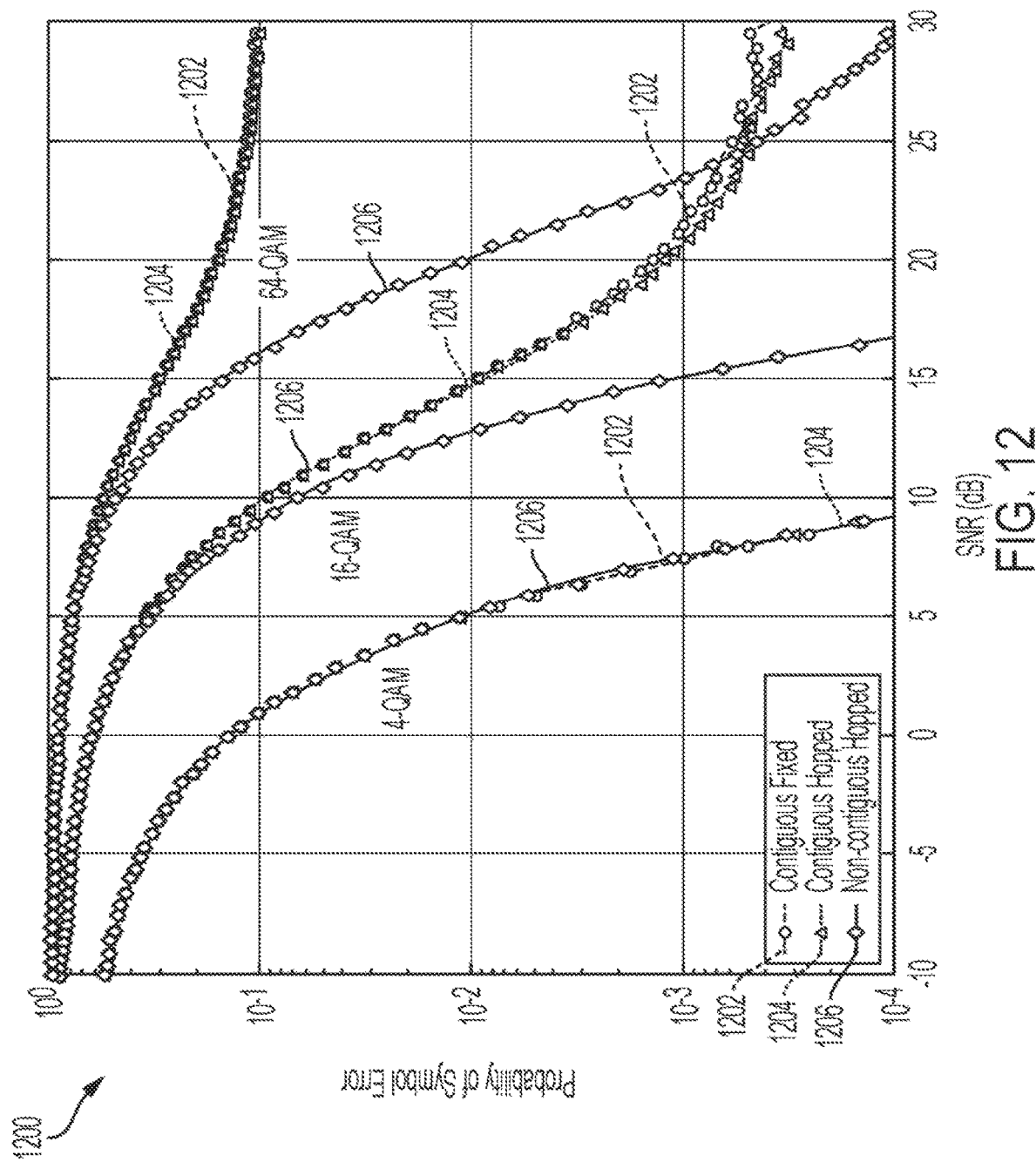
FIG. 12 is a diagram illustrating a symbol error rate associated with a signal generated in accordance with aspects of the present disclosure.

FIGS. 11 and 12 generally show similar SER trends for N=50% BT and N=75% BT, respectively. In FIG. 11, lines 1102, 1112, and 1122 represent the "Contiguous Fixed" subcarrier placement strategy, lines 1104, 1114, 1124 represent the "Contiguous Hopped" subcarrier placement strategy, and lines 1106, 1116, 1126 represent the "Non-contiguous Hopped" subcarrier placement strategy. Additionally, lines 1102, 1104, 1106 correspond to a 4-QAM symbol constellation, lines 1112, 1114, 1116 correspond to a 16-QAM symbol constellation, and lines 1122, 1124, 1126 correspond to a 64-QAM symbol constellation. In FIG. 12, lines 1202, 1212, and 1222 represent the "Contiguous Fixed" subcarrier placement strategy, lines 1204, 1214, 1224 represent the "Contiguous Hopped" subcarrier placement strategy, and lines 1206, 1216, 1226 represent the "Non-contiguous Hopped" subcarrier placement strategy. Additionally, lines 1202, 1204, 1206 correspond to a 4-QAM symbol constellation, lines 1212, 1214, 1216 correspond to a 16-QAM symbol constellation, and lines 1222, 1224, 1226 correspond to a 64-QAM symbol constellation. However, the "Contiguous Fixed" and "Contiguous Hopped" cases for 64-QAM when N=50% BT and for both 64-QAM and 16-QAM when N=75% BT reveal the emergence of a distortion-induced SER floor. These effects likely occur because the optimization process is not able to meet all of the requirements being made upon it and, while good FM noise radar waveforms of constant amplitude and pulsewidth Tare still ensured, the communication component is distorted. These results highlight the fact that the parameterization of this radar/communication trade-space should be carefully considered when designing such waveforms.

Figure 13:
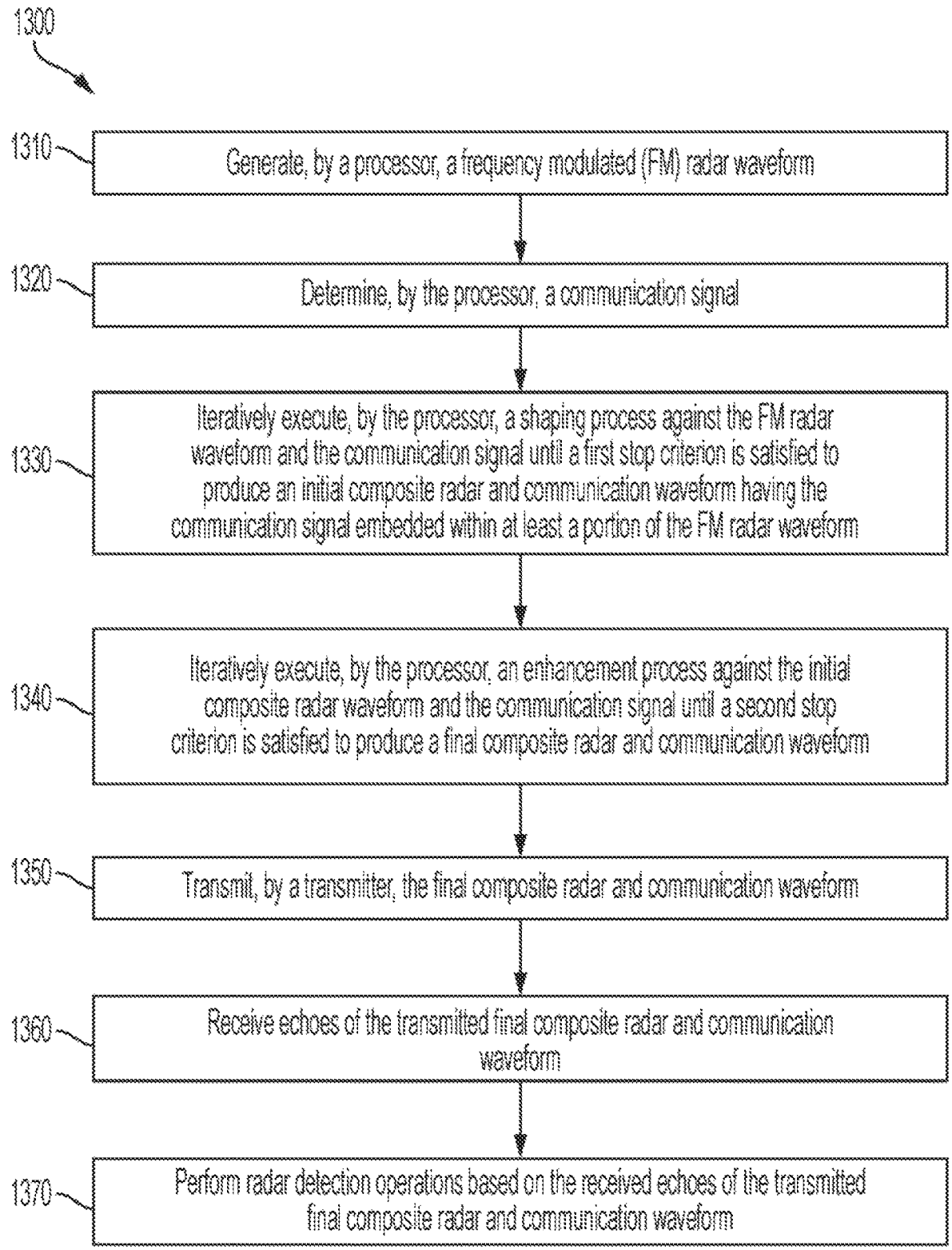
FIG. 13 is a flow diagram of a method for generating a composite radar and communication waveform in accordance with aspects of the present disclosure.

Referring to FIG. 13, a flow diagram of a method for generating a composite radar and communication waveform in accordance with aspects of the present disclosure is shown as a method 1300. The method 1300 may be performed by a system, such as system 100 of FIG. 1. Additionally, steps of the method 1300 may be implemented as a set of instructions (e.g., the instructions 122 of FIG. 1) stored at a memory (e.g., the memory 120 of FIG. 1). The instructions may be executed by one or more processors (e.g., the one or more processors 110 of FIG. 1) to cause the one or more processors to perform operations for generating and utilizing combination radar and communication waveforms according to the PE-THoRaCs techniques disclosed herein.

As shown in FIG. 13, the method 1300 may include, at step 1310, generating, by a processor, a frequency modulated (FM) radar waveform and at step 1320, determining, by the processor, a communication signal. In an aspect, the FM radar waveform and the communication signal may be generated as described above with reference to FIGS. 1-12. The communication signal may be an orthogonal frequency division multiplexing (OFDM) signal associated with a set of subcarriers and symbols, and each subcarrier of the set of subcarriers may be associated with a subcarrier frequency. At step 1330, the method 1300 includes iteratively executing, by the processor, a shaping process against the FM radar waveform and the communication signal to produce an initial composite radar and communication waveform. The initial radar and communication waveform may have the communication signal embedded within at least a portion of the FM radar waveform.

During step 1330, the shaping process may be iteratively executed until a first stop criterion is satisfied. As described above with reference to FIG. 1, the shaping process may include executing a series of projections. The series of projections may include a first projection configured to impose a spectral shaping constraint on a spectrum of the initial composite radar and communication waveform, a second projection configured to create a notch in a portion of the spectrum of the initial composite radar and communication waveform and embed the communication signal within the notch of the initial composite radar and communication waveform, and a third projection configured to modify at least one characteristic of the initial composite radar and communication waveform. As described above at Equation (1), the first projection may be configured to project the FM radar waveform onto each pulse of a set of pulsed waveforms to produce a set of pulsed FM radar waveforms. A spectral shape of the initial composite radar and communication waveform may be defined by the set of pulsed FM radar waveforms produced by a final iteration of the shaping process. As described above at Equation (2), the second projection may be configured to project each pulsed FM radar waveform of the set of pulsed FM radar waveforms onto an orthogonal complement of at least one subcarrier frequency associated with the set of subcarriers of the OFDM signal to embed the communication signal within a notch of the initial composite radar and communication waveform. As described above with respect to Equation (3), the third projection may be configured to modify a constant amplitude characteristic and/or a pulsewidth characteristic of the initial composite radar and communication waveform.

In response to a determination that the first stop criterion is satisfied, the method 1300 includes, at step 1340, iteratively executing, by the processor, an enhancement process against the initial composite radar waveform and the communication signal to produce a final composite radar and communication waveform. The enhancement process may be iteratively executed until a second stop criterion is satisfied, and the final composite radar and communication waveform may be, or may approximate, a constant amplitude waveform. The communication signal may be embedded within at least a portion of the final composite radar waveform.

As described above with reference to FIG. 1, the enhancement process may include executing a second series of projections. The second series of projections may include executing a fourth projection configured to create a notch in a portion of the spectrum of the final radar and communication waveform and embed the communication signal within the notch of the final radar and communication waveform and a fifth projection configured to configured to modify at least one characteristic of the final composite radar and communication waveform. As described above at Equation (4), the fourth projection may be configured to project each pulsed FM radar waveform of the set of pulsed FM radar waveforms onto the orthogonal complement of at least one subcarrier frequency associated with the set of subcarriers of the OFDM signal to embed the communication signal within the notch of the final radar and communication waveform. As described above at Equation (5), the fifth projection may be configured to modify a constant amplitude characteristic and/or a pulsewidth characteristic of the final composite radar and communication waveform. The final composite radar and communication waveform may be a constant amplitude waveform having an orthogonal frequency division multiplexing (OFDM) communication signal embedded therein.

At step 1350, the method 1300 includes transmitting, by a transmitter, the final composite radar and communication waveform. As described above with reference to FIG. 1, the final composite radar and communication waveform may be utilized to perform radar detection operations, such as detecting and/or tracking targets of interest. In such aspects, the method 1300 may include, at step 1360, receiving echoes of the transmitted final composite radar and communication waveform, and at step 1370, performing radar detection operations based on the received echoes of the transmitted final composite radar and communication waveform. It is noted that the final composite radar and communication waveform also facilitates data communication via the communication signal embedded within the final composite radar and communication waveform. Accordingly, in an aspect, the method 1300 may include receiving, at an antenna (e.g., the receiver 158 of FIG. 1), the final composite radar and communication waveform and performing data reception operations (e.g., OFDM demodulation, etc.) to extract the data associated with the communication signal embedded within the final composite radar and communication waveform.

As shown above, the system 100 of FIG. 1 and the method 1300 of FIG. 13 provide a new technique, referred to herein as PE-THoRaCs, for creating dual-function radar and communication waveforms. The PE-THoRaCs techniques disclosed herein, by virtue of the above-described two-stage optimization process, are configured to produce constant-amplitude pulsed radar waveforms with favorable delay/Doppler ambiguity properties that additionally contain OFDM subcarriers capable of achieving data rates on the order of Mb/s. Thus, the typical high transmit power requirement for radar can be achieved while also facilitating a dual-function operation that may have application to a variety of tactical scenarios, such as providing additional capacity in terms of data throughput of a networked environment in which radar systems are utilized. An additional advantage of embedding data of the communication signal within a PE-THoRaCs-based waveform is security against eavesdropping. For example, a composite dual-function waveform generated in accordance with the present disclosure may appear as a radar emission to an eavesdropper. The simulation results illustrated in FIGS. 3-12 demonstrate the trade-off that PE-THoRaCs provides between the number of embedded subcarriers, the symbol constellation order, spectral containment, and SER performance. This manner of OFDM implementation may also prove useful to achieve communication-only waveforms with PAPR=0 dB, which may facilitate new transmission capability for some technologies, such as base stations (e.g., evolved Node bs (eNBs), next generation Node bs (gNBs), and the like) and other devices operating in OFDM-based communication networks.

It is noted that while the simulation results shown in FIGS. 3-12 illustrate various advantages provided by the embodiments disclosed herein, open-air testing to evaluate actual radar and communication operation and performance was conducted to validate the simulation results. The results of the open-air testing are described in detail below.

The open-air testing was performed from the roof of Nichols Hall on the University of Kansas campus. A moving target indication (MTI) mode was evaluated using separate transmit and receive antennas pointed at the intersection of 23rd and Iowa streets, which contains ample motor vehicle traffic in a sufficiently radial orientation. For the open-air testing, a set of $M=10^3$ pulsed waveforms having a time-bandwidth product of BT=200 (B=66.7 MHz and T=3 µs) were designed according to Equations (1)-(4). The collective CPI therefore had an effective BT of $2 \times 10^5$ that provided ~53 dB of coherent integration gain in the radar receiver.

Each test waveform was digitally upsampled to 10 GS/s in Matlab™ and up-converted to a center frequency of 3.55 GHz for physical generation on a Tektronix AWG70002A arbitrary waveform generator (AWG) at a pulse repetition frequency (PRF) of 25 kHz. The received signal (for either radar or communications) was I/Q sampled by a Rohde & Schwarz FSW Real-time Spectrum Analyzer (RSA) at a rate of 200 MS/s. The reflections produced by each of the M=103 transmitted waveforms were pulse compressed using a loopback-measured version of the waveform to account for any hardware distortion effects. Doppler processing using a Taylor window was subsequently performed along with a simple zero-Doppler projection clutter canceller (since the platform was stationary).

Figure 14:
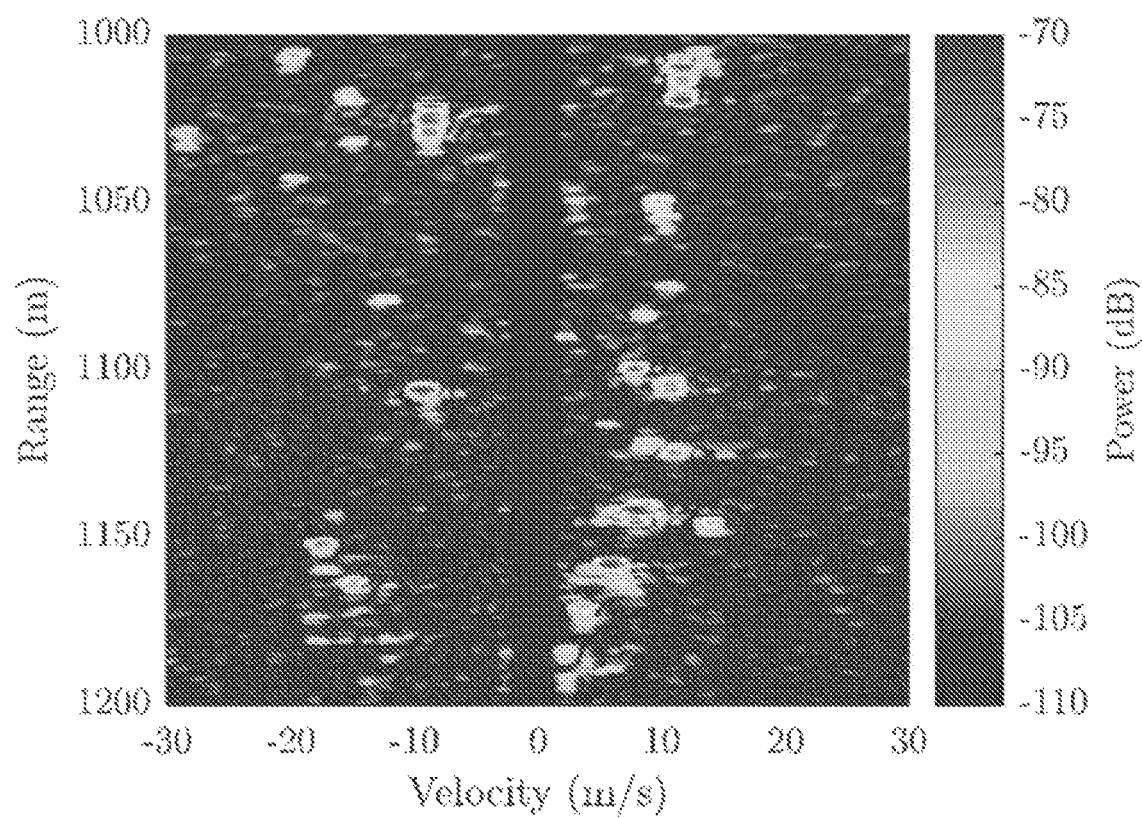
FIG. 14 is a Range-Doppler plot of experimentally illuminated moving targets by THoRaCs waveforms in accordance with aspects of the present disclosure.

A Range-Doppler plot of experimentally illuminated moving targets by 1000 unique THoRaCs waveforms with BT=200 is shown in FIG. 14. The range-Doppler plot of FIG. 14 illustrates the particular case of optimized waveforms having N=50 (25% of BT) subcarriers per pulse, independently modulated with equally probable random symbols from a 4-QAM constellation, and arranged according to the "Contiguous Fixed" strategy in the center of the band. During the open-air testing it was observed that several moving vehicles were clearly visible and the background sidelobes were quite low due to their incoherent integration over the 1000 unique pulsed waveforms in the CPI. It was also observed (not shown here) that designing waveforms according to other parameter combinations yields results that are qualitatively indistinguishable from the results shown in FIG. 14.

To establish an experimental performance baseline for the communication aspect of THoRaCs a simple loopback capture of each waveform in which the transmitter (AWG) was connected directly to the receiver (RSA) was considered. The AWG and RSA were referenced from the same clock to avoid synchronization effects and the hardwired channel did not exhibit multipath, thus also avoiding the need for equalization (these effects were addressed for the open-air measurements).

Figure 15:
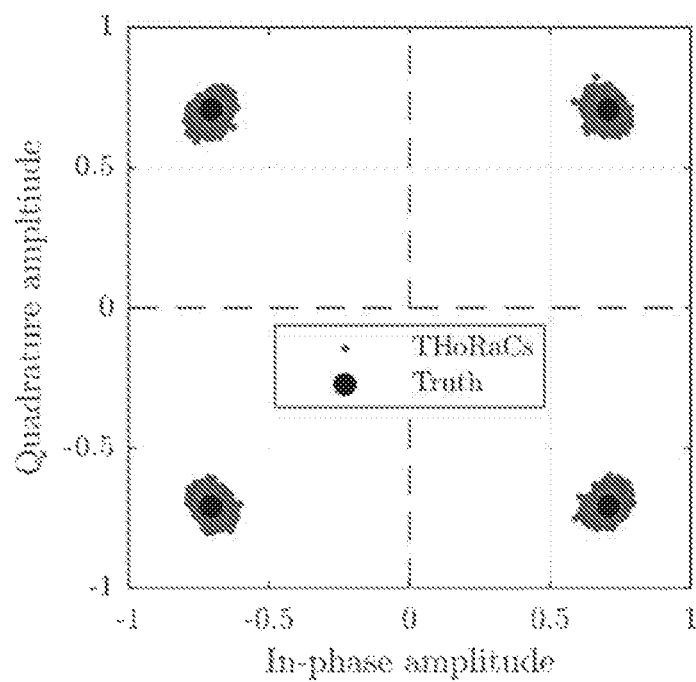
FIG. 15 is a diagram illustrating aspects of 4-QAM demodulated symbol constellations embedded within THoRaCs waveforms in accordance with aspects of the present disclosure.
Figure 16:
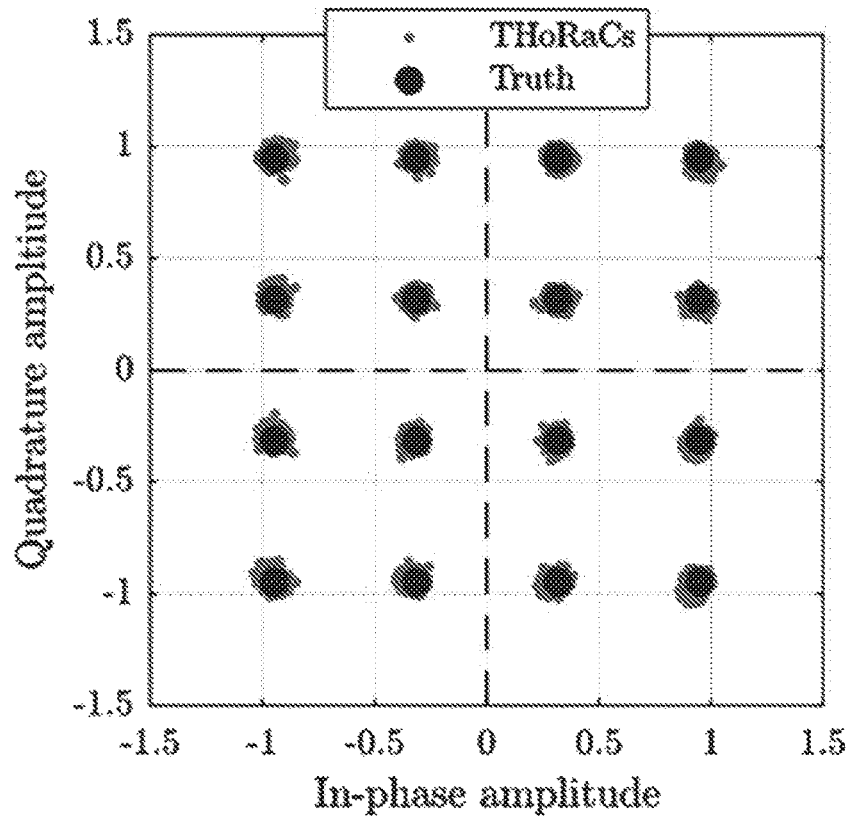
FIG. 16 is a diagram illustrating aspects of 16-QAM demodulated symbol constellations embedded within THoRaCs waveforms in accordance with aspects of the present disclosure.
Figure 17:
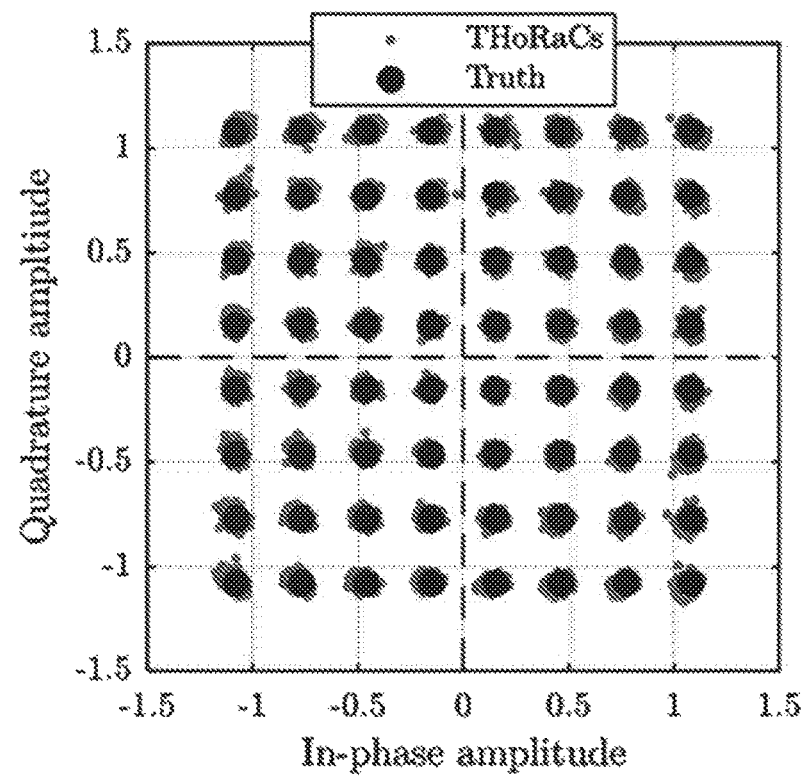
FIG. 17 is a diagram illustrating aspects of 64-QAM demodulated symbol constellations embedded within THoRaCs waveforms in accordance with aspects of the present disclosure.

FIGS. 15-17 illustrate 4-QAM (FIG. 15), 16-QAM (FIG. 16), and 64-QAM (FIG. 17) demodulated symbol constellations when embedded within 1000 unique THoRaCs waveforms having N=50 (25% of BT) subcarriers per pulse arranged according to the "Contiguous Fixed" strategy (described above) in the center of the band (e.g., same as the radar assessment). Thus, the cases illustrated in FIGS. 15-17 correspond to respective data rates of 2.5 Mbps, 5.0 Mbps, and 7.5 Mbps, respectively. The root-mean-square (RMS) error vector magnitude (EVM), expressed as a percentage of the average symbol energy of the constellation, in these cases was 4.0%, 3.0% and 3.2%, respectively.

Figure 21:
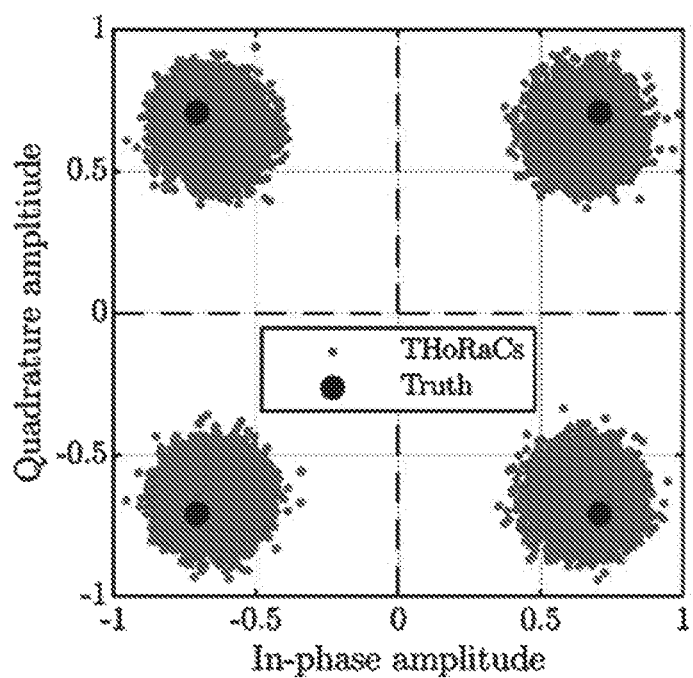
FIG. 21 is a diagram illustrating additional aspects of THoRaCs waveforms in accordance with aspects of the present disclosure.

As can be seen in FIGS. 15-17, these cases illustrate excellent agreement with the true symbol values, which was expected since only 25% of BT was being devoted to embedding information and thus there was sufficient design freedom to effectively avoid the error-causing distortion. In contrast, FIG. 21 illustrates shows an arrangement with N=150 subcarriers (75% of BT) in each THoRaCs pulse. Due to the final stage of the design process the waveforms are still random FM and thus the expected radar performance is unchanged. However, as evidenced by FIG. 21, attempting to impose the fixed OFDM structure (for the given set of arbitrary symbols) onto the waveform design results in degradation of symbol accuracy. The EVM in this case has increased to 10.9%, a factor of 24 increase over a noise-free simulation. Conceptually, the excess signal e(t) simply does not possess enough degrees of freedom by itself to provide an FM signal structure for s(t), and so r(t) was altered as well. It is noted that radar waveforms according to the THoRaCs techniques disclosed herein may adhere to the arrangement:

$$s(t)=r(t)+e(t)=\exp(j\varphi(t)), \quad \text{Equation (7)}$$

where the e(t) term corresponds to the "excess signal" that is required for the OFDM signal r(t) to be subsumed into the FM structure of s(t) in this additive manner. The THoRaCs construction disclosed herein has a final stage that forces adherence to the right-hand side of Equation (7), and may therefore induce some distortion of the intended OFDM signal e(e) if the excess signal e(t) does not possess sufficient degrees of freedom with which to compensate.

As with standard communications, the presence of noise, fading, and multipath over a free-space link further hinder the receiver's ability to correctly determine the embedded symbols, thus necessitating channel equalization and possibly some manner of error correction. Given that these factors are unavoidable, the selection of N (as a percentage of BT) becomes an important decision in the practical implementation of this radar/communication emission scheme. The constellation density also does not appear to introduce any appreciable distortion when the waveforms are physically implemented because all three loopback captures were demodulated with no symbol errors. Errors, had they been observed, could have been attributable to waveform distortion since the loopback arrangement was nearly noise-free.

For THoRaCs waveforms to operate in an open-air environment as their dual-function nature intends, the communication receiver performs synchronization and channel estimation/equalization based on known pilot symbols prior to determination of the information-bearing symbols. Since the embedded communication signal in (Equation 1) does not include the usual OFDM cyclic prefix, which is expected to otherwise introduce ambiguities in the form of increased radar range sidelobes, standard OFDM frequency domain equalization could realize some degradation due to mismatch effects. During the open-air testing, channel equalization was performed by estimating the inverse of the channel response with a Wiener Filter (WF) and then forming an inverse filter using a zero-forcing (ZF) equalizer.

Denote the signal captured at the communication receiver as $$y(t)=s(t)*g(t)+v(t) \quad \text{Equation (8)}$$

in which g(t) is the impulse response of the one-way communication channel and v(t) is additive white Gaussian noise (AWGN). In discretized form the WF estimate of the channel may be expressed as:

$$\hat{g}=R^{-1}p, \quad \text{Equation (9)}$$

for R the autocorrelation matrix of s(t) and p the cross-correlation between s(t) and y(t). The determination of these terms requires that the given waveform be known at the communication receiver (i.e. a "pilot waveform").

Using the WF channel estimate from Equation (9) an equalizer can then be realized by:

$$c=(A^HA+\sigma I)^{-1}A^He, \quad \text{Equation (10)}$$

where I is an identity matrix, σ is a small loading factor, e is an elementary vector with a '1' in the middle element and zeros elsewhere, and the matrix:

$$A = \begin{bmatrix} \hat{g} & 0 & \cdots & 0 \\ 0 & \hat{g} & \ddots & \vdots \\ \vdots & \ddots & \ddots & 0 \\ 0 & \cdots & 0 & \hat{g} \end{bmatrix}. \quad \text{Equation (10)}$$

The ZF equalizer in Equation (10) can then be applied to the discretized version of Equation (8) to compensate for channel distortion.

To assess the open-air experimental communication of the experimental system, the same three sets of 1000 THoRaCs waveforms evaluated in the loopback tests described above were transmitted in open-air on the back lawn of Nichols Hall on the University of Kansas campus. The placement of the transmit and receive antennas were separated by approximately 50 meters and possessed a line-of-sight (LOS) path. As with the loopback measurements, the AWG feeds the transmit antenna and the RSA was used to obtain the signal captured by the receive antenna. Unlike the loopback measurements, no common clock reference exists and there is some multipath due to ground bounce and nearby buildings and trees.

For each set of 1000 waveforms, every 50th pulse served as a pilot waveform to perform channel estimation and equalization, as described above, after RSA capture, and was applied to the subsequent 49 received pulses. It was also necessary to estimate the frequency offset that naturally arises because the transmitter and receiver have separate clocks and thus cannot be perfectly synchronized. Because this offset tends to be relatively small, the pulsed configuration permits a pulse-to-pulse phase change to be estimated between consecutive pulses. For the experimental assessment the 1st and 2nd pulses out of each set of 1000 were employed as pilots to determine this phase offset that was subsequently used to compensate all other pulses for frequency offset in a progressive manner. When channel re-estimation occurs at each 50th pulse the progressive frequency offset compensation was likewise restarted to address the inevitable error-induced phase drift.

Figure 18:
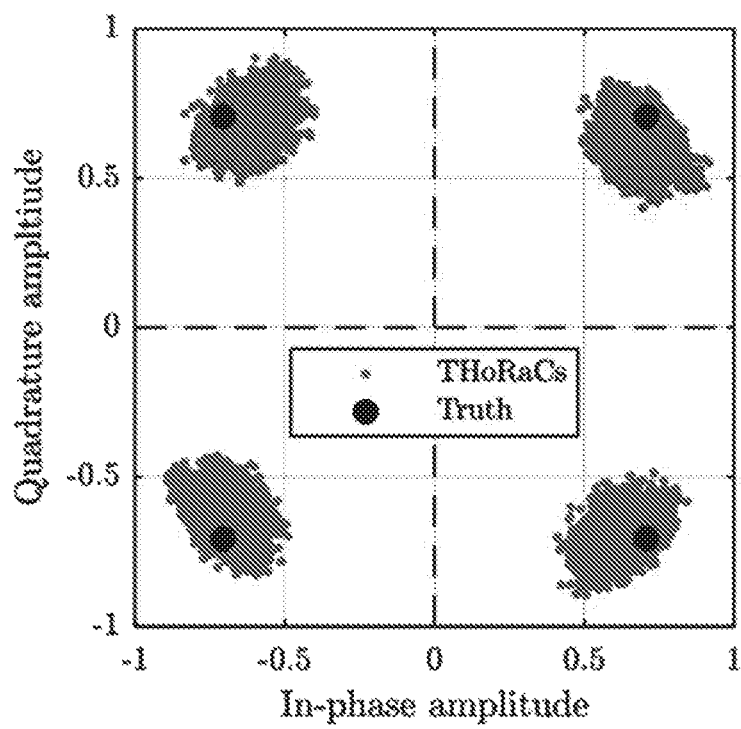
FIG. 18 is a diagram illustrating aspects of 4-QAM demodulated symbol constellations, respectively, after open-air capture and subsequent synchronization/equalization in accordance with aspects of the present disclosure.
Figure 19:
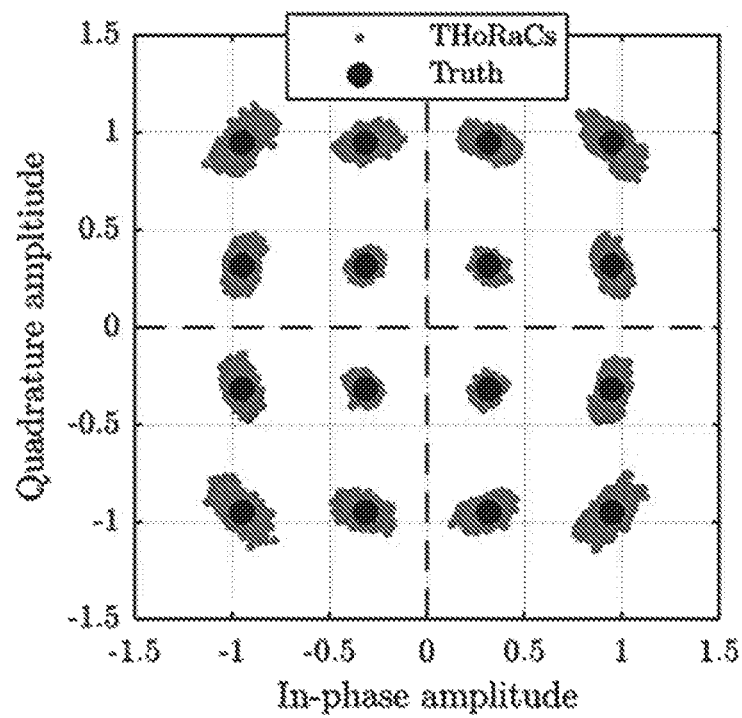
FIG. 19 is a diagram illustrating aspects of 16-QAM demodulated symbol constellations, respectively, after open-air capture and subsequent synchronization/equalization in accordance with aspects of the present disclosure.
Figure 20:
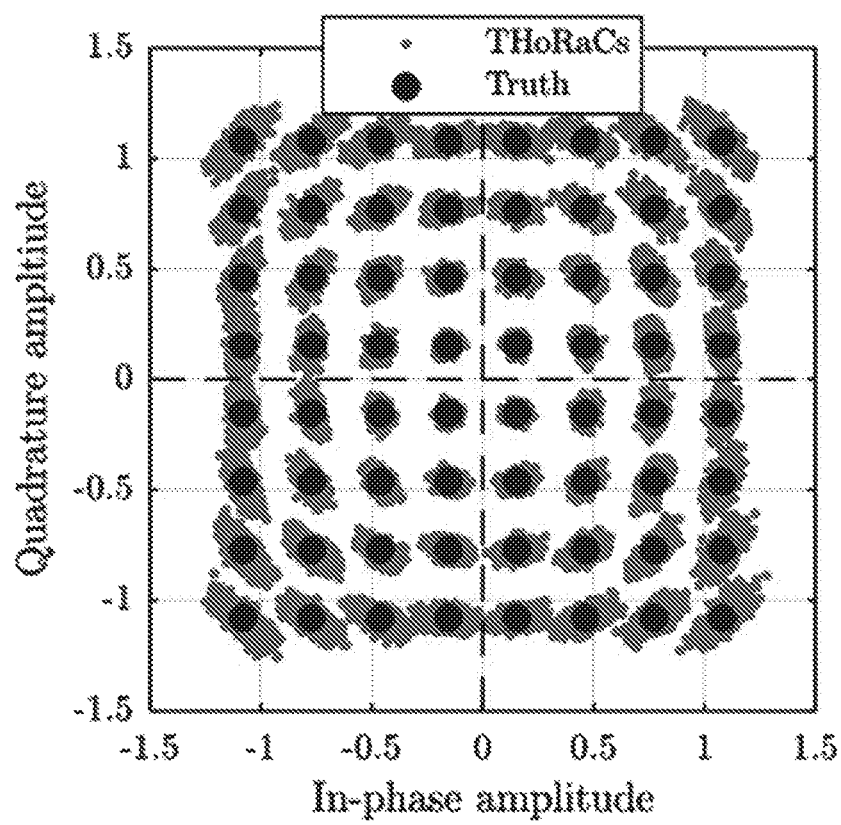
FIG. 20 is a diagram illustrating aspects of 64-QAM demodulated symbol constellations, respectively, after open-air capture and subsequent synchronization/equalization in accordance with aspects of the present disclosure.

FIGS. 18-20 show 4-QAM (FIG. 18), 16-QAM (FIG. 19), and 64-QAM (FIG. 20) demodulated symbol constellations, respectively, after open-air capture and subsequent synchronization/equalization. The EVM in these cases was 10.2%, 5.6% and 5.2%, respectively, representing increases by 2.6×, 1.9×, and 1.6× over their loopback capture counterparts in FIGS. 15-17. Compared to the loopback captures in FIGS. 15-17 an expected increased spreading about the true symbol values was observed. Moreover, the prominent phase-orientated nature of this spreading can likely be attributed to the rather crude approach taken for frequency offset estimation and subsequent synchronization.

There was insufficient data to measure a non-zero SER for the 4-QAM and 16-QAM cases in this open-air test, though the 64-QAM case did realize an SER of $1.8\times10^{-3}$ (excluding the 20 pilot waveforms). Compared to the corresponding simulated analysis in FIG. 10, these results agree with the high SNR regime (for communications) of 20 dB or so.

The experimental communication results along with the above-described measured radar performance clearly demonstrate that THoRaCs represents a viable approach to embedding an information-bearing payload into radar waveforms while preserving the efficacy of the radar mission. It is noted that the above-described evaluation involved standard channel estimation/equalization, a rather unsophisticated approach to frequency offset estimation for synchronization, and no form of error correction coding. It therefore stands to reason that more sophisticated techniques could be incorporated into the communication component, including the possibility of various forms of MIMO (noting the benefits to radar and communication can be quite different in this regard).

Further experimental assessment may be needed to understand the impact that nonlinear distortion by a truly high-power transmitter could cause. While FM waveforms theoretically only reside at a single instantaneous frequency, memory effects in the transmitter still produces some degree of intermodulation. The inherent nonrepeating nature of these waveforms make them rather robust to these degradations from a radar perspective as long as adequate loopback capture of the amplified waveform is available with sufficient fidelity. It remains to be seen, however, how the communication component will fare.

Although the embodiments of the present disclosure and their advantages have been described in detail, it should be understood that various changes, substitutions and alterations can be made herein without departing from the spirit and scope of the disclosure as defined by the appended claims. Further, although the drawings may illustrate some of the concepts disclosed herein as logical or functional blocks, it is to be understood that each of those blocks may be implemented in hardware, software, or a combination of hardware and software. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of generating a composite radar and communication waveform, the method comprising:
    generating, by a processor, a frequency modulated (FM) radar waveform;
    determining, by the processor, a communication signal;

iteratively executing, by the processor, a shaping process against the FM radar waveform and the communication signal until a first stop criterion is satisfied to produce an initial composite radar and communication waveform having the communication signal embedded within at least a portion of the FM radar waveform;

iteratively executing, by the processor, an enhancement process against the initial composite radar and communication waveform and the communication signal until a second stop criterion is satisfied to produce a final composite radar and communication waveform, wherein the final composite radar and communication waveform is a constant amplitude waveform, and wherein the communication signal is embedded within at least a portion of the final composite radar and communication waveform; and transmitting, by a transmitter, the final composite radar and communication waveform.

2. The method of claim 1, wherein each iteration of the shaping process comprises:

executing a first projection configured to impose a spectral shaping constraint on a spectrum of the initial composite radar and communication waveform;

executing a second projection configured to create a notch in a portion of the spectrum of the initial composite radar and communication waveform and embed the communication signal within the notch of the initial composite radar and communication waveform; and executing a third projection configured to modify at least one characteristic of the initial composite radar and communication waveform.

3. The method of claim 2, wherein executing the first projection comprises:

projecting the FM radar waveform onto each pulse of a set of pulsed waveforms to produce a set of pulsed FM radar waveforms, wherein a spectral shape of the initial composite radar and communication waveform is defined by the set of pulsed FM radar waveforms produced by a final iteration of the shaping process.

4. The method of claim 3, wherein the communication signal comprises an orthogonal frequency division multiplexing (OFDM) signal associated with a set of subcarriers and symbols, wherein each subcarrier of the set of subcarriers is associated with a subcarrier frequency, and wherein executing the second projection comprises:

projecting each pulsed FM radar waveform of the set of pulsed FM radar waveforms onto an orthogonal complement of at least one subcarrier frequency associated with the set of subcarriers of the OFDM signal to embed the communication signal within the notch of the initial composite radar and communication waveform.

5. The method of claim 4, wherein executing the third projection comprises modifying one of a constant amplitude characteristic and a pulsewidth characteristic of the initial composite radar and communication waveform.

6. The method of claim 2, wherein each iteration of the enhancement process executed against the initial composite radar and communication waveform comprises:

executing a fourth projection configured to create a notch in a portion of a spectrum of the final composite radar and communication waveform and embed the communication signal within the notch of the final composite radar and communication waveform; and executing a fifth projection configured to modify at least one characteristic of the final composite radar and communication waveform.

7. The method of claim 6, wherein the communication signal comprises an orthogonal frequency division multiplexing (OFDM) signal associated with a set of subcarriers and symbols, wherein each subcarrier of the set of subcarriers is associated with a subcarrier frequency, and wherein executing the fourth projection comprises:

projecting each pulsed FM radar waveform of the set of pulsed FM radar waveforms onto the orthogonal complement of at least one subcarrier frequency associated with the set of subcarriers of the OFDM signal to embed the communication signal within the notch of the final composite radar and communication waveform.

8. The method of claim 7, wherein executing the fifth projection comprises modifying one of the constant amplitude characteristic and a pulsewidth characteristic of the final composite radar and communication waveform.

9. The method of claim 1, wherein the final composite radar and communication waveform comprises a constant amplitude waveform having an orthogonal frequency division multiplexing (OFDM) communication signal embedded therein.

10. The method of claim 1, further comprising:

receiving echoes of the transmitted final composite radar and communication waveform; and performing radar detection operations based on the received echoes of the transmitted final composite radar and communication waveform.

11. The method of claim 1, wherein the first stop criterion is one of an autocorrelation property associated with the initial composite radar and communication waveform, a peak sidelobe property associated with the initial composite radar and communication waveform, and a predicted error rate associated with the initial composite radar and communication waveform.

12. The method of claim 1, wherein the second stop criterion is one of an autocorrelation property associated with the final composite radar and communication waveform, a peak sidelobe property associated with the final composite radar and communication waveform, and a predicted error rate associated with the final composite radar and communication waveform.

13. A system for generating a composite radar and communication waveform, the system comprising:

at least one processor configured to:

generate a frequency modulated (FM) radar waveform;

determine a communication signal;

iteratively execute a shaping process against the FM radar waveform and the communication signal until a first stop criterion is satisfied to produce an initial composite radar and communication waveform having the communication signal embedded within at least a portion of the FM radar waveform;

iteratively execute an enhancement process against the initial composite radar and communication waveform and the communication signal until a second stop criterion is satisfied to produce a final composite radar and communication waveform, wherein the final composite radar and communication waveform is a constant amplitude waveform, and wherein the communication signal is embedded within at least a portion of the final composite radar and communication waveform;

a memory communicatively coupled to the at least one processor; and a transmitter configured to transmit the final composite radar and communication waveform.

14. The system of claim 13, wherein the communication signal comprises an orthogonal frequency division multiplexing (OFDM) signal associated with a set of subcarriers and symbols, and wherein, during each iteration of the shaping process, the at least one processor is configured to:
project the FM radar waveform onto each pulse of a set of pulsed waveforms to produce a set of pulsed FM radar waveforms, wherein a spectral shape of the initial composite radar and communication waveform is defined by the set of pulsed FM radar waveforms produced by a final iteration of the shaping process;
project each pulsed FM radar waveform of the set of pulsed FM radar waveforms onto an orthogonal complement of at least one subcarrier frequency associated with the set of subcarriers of the OFDM signal to embed the communication signal within a notch of the initial composite radar and communication waveform; and
modify one of a constant amplitude characteristic and a pulsewidth characteristic of the initial composite radar and communication waveform.

15. The system of claim 14, wherein, during each iteration of the enhancement process, the at least one processor is configured to:
project each pulsed FM radar waveform of the set of pulsed FM radar waveforms onto the orthogonal complement of at least one subcarrier frequency associated with the set of subcarriers of the OFDM signal to embed the communication signal within a notch of the final composite radar and communication waveform; and
modify one of the constant amplitude characteristic and the pulsewidth characteristic of the final composite radar and communication waveform.

16. The system of claim 13, wherein the final composite radar and communication waveform comprises a constant amplitude waveform having an orthogonal frequency division multiplexing (OFDM) communication signal embedded therein.

17. The system of claim 13, further comprising:
a receiver configured to receive echoes of the transmitted final composite radar and communication waveform,
wherein the at least one processor is configured to perform radar detection operations based on the received echoes of the transmitted final composite radar and communication waveform.

18. The system of claim 13, wherein the first stop criterion is one of an autocorrelation property associated with the initial composite radar and communication waveform, a peak sidelobe property associated with the initial composite radar and communication waveform, and a predicted error rate associated with the initial composite radar and communication waveform, and wherein the second stop criterion is one of an autocorrelation property associated with the final composite radar and communication waveform, a peak sidelobe property associated with the final composite radar and communication waveform, and a predicted error rate associated with the final composite radar and communication waveform.

19. A non-transitory computer-readable storage medium storing instructions that, when executed by one or more processors, causes the one or more processors to perform operations for generating a composite radar and communication waveform, the operations comprising:
generating a frequency modulated (FM) radar waveform;
determining a communication signal;
iteratively executing a shaping process against the FM radar waveform and the communication signal until a first stop criterion is satisfied to produce an initial composite radar and communication waveform having the communication signal embedded therein, and wherein each iteration of the shaping process comprises:
imposing a spectral shaping constraint on a spectrum of the initial composite radar and communication waveform;
creating a notch in a portion of the spectrum of the initial composite radar and communication waveform;
embedding the communication signal within the notch of the initial composite radar and communication waveform; and
modifying at least one characteristic of the initial composite radar and communication waveform subsequent to embedding the communication signal within the notch of the initial composite radar and communication waveform;
iteratively executing an enhancement process against the initial composite radar and communication waveform and the communication signal until a second stop criterion is satisfied to produce a final composite radar and communication waveform, wherein the final composite radar and communication waveform is a constant amplitude waveform having the communication signal embedded therein, and wherein each iteration of the enhancement process comprises:
creating a notch in a portion of the spectrum of the final composite radar and communication waveform and embed the communication signal within the notch of the final composite radar and communication waveform; and
modifying a characteristic of the final composite radar and communication waveform, the characteristic comprising one of a constant amplitude characteristic of the final composite radar and communication waveform and a pulsewidth characteristic of the final composite radar and communication waveform;
transmitting the final composite radar and communication waveform;
receiving echoes of the transmitted final composite radar and communication waveform; and
performing radar detection operations based on the received echoes of the transmitted final composite radar and communication waveform.

20. The non-transitory computer-readable storage medium of claim 19, wherein the final composite radar and communication waveform comprises a constant amplitude waveform having an orthogonal frequency division multiplexing (OFDM) communication signal embedded therein.

* * * * *

UNITED STATES PATENT AND TRADEMARK OFFICE
CERTIFICATE OF CORRECTION

PATENT NO. : 12,000,949 B2
APPLICATION NO. : 17/269077
DATED : June 4, 2024
INVENTOR(S) : Gerald Brandon Ravenscroft et al.

It is certified that error appears in the above-identified patent and that said Letters Patent is hereby corrected as shown below:

In the Specification

At Column 14, Line number 55, delete "Tare still ensured" and replace with --T are still ensured--.

Signed and Sealed this
Thirteenth Day of August, 2024

*Katherine Kelly Vidal*

Katherine Kelly Vidal
*Director of the United States Patent and Trademark Office*